US012717108B2

(12) United States Patent
Sato et al.

(10) Patent No.: US 12,717,108 B2
(45) Date of Patent: Aug. 25, 2026

(54) METHOD AND SYSTEM FOR MANUFACTURING OPTICAL FIBER RIBBON

(71) Applicant: FUJIKURA LTD., Tokyo (JP)

(72) Inventors: Hironori Sato, Chiba (JP); Hiroyuki Takahashi, Chiba (JP); Itaru Ishida, Chiba (JP); Ken Osato, Chiba (JP)

(73) Assignee: Fujikura Ltd., Tokyo (JP)

( * ) Notice: Subject to any disclaimer, the term of this patent is extended or adjusted under 35 U.S.C. 154(b) by 304 days.

(21) Appl. No.: 18/561,894

(22) PCT Filed: Feb. 28, 2022

(86) PCT No.: PCT/JP2022/008426
§ 371 (c)(1),
(2) Date: Nov. 17, 2023

(87) PCT Pub. No.: WO2022/244371
PCT Pub. Date: Nov. 24, 2022

(65) Prior Publication Data

US 2024/0241336 A1 Jul. 18, 2024

(30) Foreign Application Priority Data

May 17, 2021 (JP) ................................ 2021-083455

(51) Int. Cl.
*G02B 6/44* (2006.01)
*G01L 1/24* (2006.01)
(Continued)

(52) U.S. Cl.
CPC .............. *G02B 6/448* (2013.01); *G01L 1/242* (2013.01); *G01M 11/0214* (2013.01); *G01M 11/088* (2013.01); *G02B 6/4403* (2013.01)

(58) Field of Classification Search
None
See application file for complete search history.

(56) References Cited

U.S. PATENT DOCUMENTS 6,053,085 A * 4/2000 Lochkovic ............. G02B 6/567 83/590
2018/0321454 A1* 11/2018 Sato ....................... G02B 6/441
(Continued)

FOREIGN PATENT DOCUMENTS

JP H11316329 A 11/1999
JP 3524374 B2 5/2004
(Continued)

OTHER PUBLICATIONS

JP 2015021734 A English translation (Year: 2015).*
(Continued)

*Primary Examiner* — Charlie Y Peng
(74) *Attorney, Agent, or Firm* — Osha Bergman Watanabe & Burton LLP

(57) ABSTRACT

A manufacturing method for manufacturing an optical fiber ribbon, the manufacturing method includes intermittently forming, with a connecting device, connection parts between optical fibers measuring a load of the connecting device during the intermittent forming of the connection parts, and detecting an abnormality based on the load.

11 Claims, 12 Drawing Sheets

(51) Int. Cl.

| | |
|---|---|
| ***G01M 11/02*** | (2006.01) |
| ***G01M 11/08*** | (2006.01) |

(56) References Cited

U.S. PATENT DOCUMENTS

| | | | | |
|---|---|---|---|---|
| 2019/0250347 | A1 | 8/2019 | Fallahmohammadi et al. | |
| 2019/0317289 | A1* | 10/2019 | Sekine | G02B 6/44 |
| 2022/0317399 | A1 | 10/2022 | Murakoshi et al. | |

FOREIGN PATENT DOCUMENTS

| | | | | |
|---|---|---|---|---|
| JP | 2004314458 | A | 11/2004 | |
| JP | 3822128 | B2 * | 9/2006 | G02B 6/449 |
| JP | 2010068802 | A | 4/2010 | |
| JP | 2012208310 | A | 10/2012 | |
| JP | 2013257394 | A | 12/2013 | |
| JP | 2015021734 | A | 2/2015 | |
| JP | 2015132682 | A | 7/2015 | |
| JP | 2017056196 | A | 3/2017 | |
| JP | 2017181513 | A | 10/2017 | |
| JP | 2018510078 | A | 4/2018 | |
| JP | 2018075740 | A | 5/2018 | |
| JP | 6383457 | B2 | 8/2018 | |
| JP | 2018180553 | A | 11/2018 | |
| JP | 2021014876 | A | 2/2021 | |
| JP | 2021030382 | A | 3/2021 | |
| JP | 2021032988 | A | 3/2021 | |

OTHER PUBLICATIONS

JP-3822128-B2 English translation (Year: 2006).*

International Search Report issued in corresponding International Application No. PCT/JP2022/008426, dated Apr. 12, 2022, with translation (7 pages).

* cited by examiner (IN CASE OF SETTING ABNORMALITY)

(DURING NORMAL TIMES)

(CONNECTING AGENT DEPLETION)

(FOREIGN MATTER)

(BREAKAGE OF ROTARY BLADE)

(IN CASE OF PATTERN ABNORMALITY)

(DURING NORMAL TIMES)

(DURING NORMAL TIMES)

(IN CASE OF ABNORMALITY)

METHOD AND SYSTEM FOR MANUFACTURING OPTICAL FIBER RIBBON

CROSS-REFERENCE TO RELATED APPLICATIONS

The present application claims priority to Japanese Patent Application No. 2021-083455, filed May 17, 2021. The contents of this application are incorporated herein by reference in their entirety.

BACKGROUND

Technical Field

The present invention relates to a method and a system for manufacturing an optical fiber ribbon.

Description of the Related Art

PTL 1 discloses an inspection method for inspecting an intermittently-connected optical fiber ribbon in which a plurality of optical fibers are connected intermittently.

PATENT LITERATURE

PTL 1: Japanese Patent No. 6383457

In the manufacturing method disclosed in PTL 1, inspection of the intermittently-connected optical fiber ribbon is performed after manufacturing the optical fiber ribbon. Thus, there may be a delay in detecting abnormalities.

SUMMARY

One or more embodiments enable early detection of abnormalities occurring during manufacturing of an intermittently-connected optical fiber ribbon.

A method for manufacturing an optical fiber ribbon according to one or more embodiments includes: intermittently forming, with a connecting device, connection parts between optical fibers; measuring a load of the connecting device when intermittently forming the connection parts; and detecting an abnormality based on the load.

Other features of one or more embodiments will become apparent from the following Description and Drawings.

One or more embodiments can achieve early detection of abnormalities occurring during manufacturing of an intermittently-connected optical fiber ribbon.

DESCRIPTION OF THE EMBODIMENTS

Figure 1A:
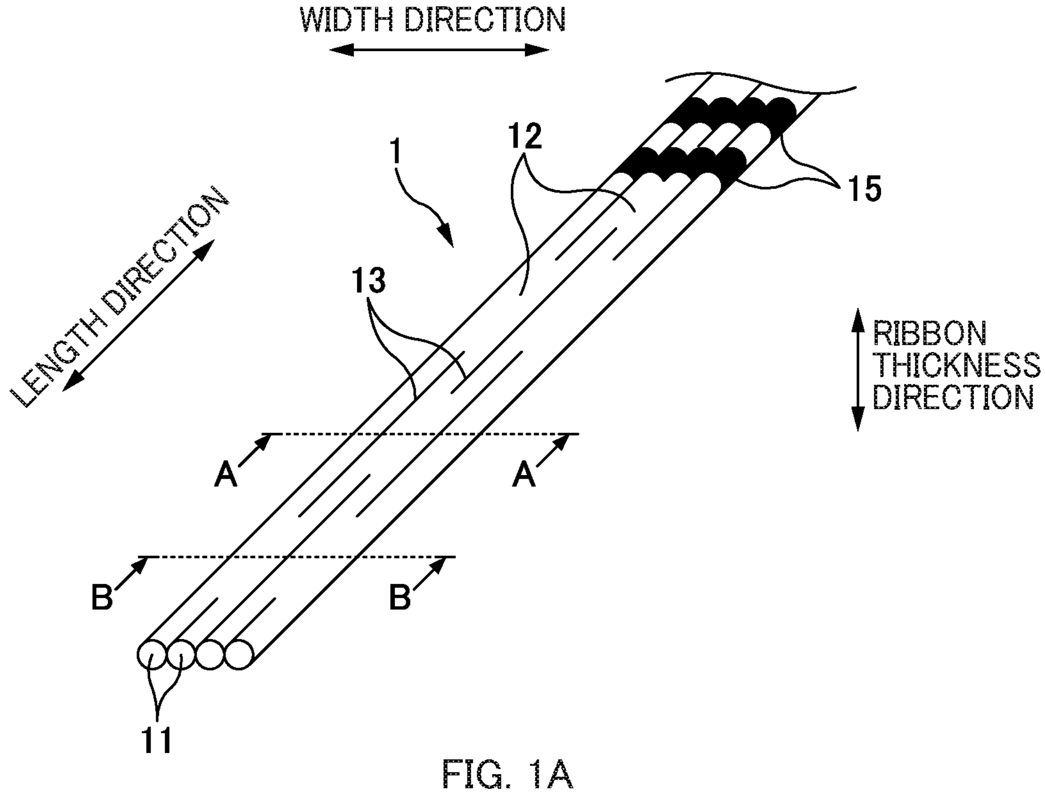
FIG. 1A is a perspective view of an intermittently-connected optical fiber ribbon.

At least the following features are disclosed in the Description and Drawings as described below.

Disclosed is a method for manufacturing an optical fiber ribbon, the manufacturing method including: intermittently forming, with a connecting device, connection parts between optical fibers; measuring a load of the connecting device when intermittently forming the connection parts; and detecting an abnormality based on the load. With this manufacturing method, it is possible to achieve early detection of abnormalities occurring during manufacturing of an intermittently-connected optical fiber ribbon.

It is preferable that the connecting device includes a motor, a torque of the motor is measured as the load, and an abnormality is detected based on the torque. In this way, abnormalities can be detected at an early stage based on the torque of a motor.

It is preferable that the connecting device includes a separating unit configured to intermittently separate the optical fibers, the torque of the motor which is configured to drive the separating unit is measured as the load, and an abnormality is detected based on the torque.

It is preferable that the separating unit includes a rotary blade, a rotation position of the rotary blade is measured, and an abnormality in layout of the connection parts is detected based on the torque and the rotation position. In this way, abnormalities in the layout (pattern) of connection parts can be detected at an early stage.

It is preferable that the load when the connecting device is caused to perform a first operation is measured, and if it is determined that there is no abnormality based on the load when the connecting device is caused to perform the first operation, the connecting device, which has been performing the first operation, is caused to perform a second operation to form the connection parts. In this way, damage to the connecting device can be suppressed.

It is preferable that, at the time of detecting an abnormality based on the load when the connecting device is caused to perform the first operation, the load is compared with pre-defined initial determination data, and, at the time of detecting an abnormality based on the load when the connecting device is caused to perform the second operation, the load is compared with data updated based on the load when the connecting device is caused to perform the second operation. In this way, determination error can be suppressed.

It is preferable that the connecting device includes a dispenser configured to apply a connecting agent, a load of an actuator of the dispenser is measured, and an abnormality is detected based on the load of the actuator.

It is preferable that the actuator includes a piezoelectric element, the piezoelectric element measures residual vibration of the connecting agent after the piezoelectric element is driven to apply the connecting agent to the optical fibers, and an abnormality is detected based on the residual vibration. In this way, the actuator can function as a part of the measurement device.

Also disclosed is a system for manufacturing an optical fiber ribbon, the manufacturing system including: a connecting device configured to intermittently form connection parts between optical fibers; a measurement device (example of a measurer) configured to measure a load of the connecting device when intermittently forming the connection parts; and a control device (example of a controller) configured to detect an abnormality based on the load. With this manufacturing system, it is possible to achieve early detection of abnormalities occurring during manufacturing of an intermittently-connected optical fiber ribbon.

First Example

Structure of Intermittently-Connected Optical Fiber Ribbon

Figure 1B:
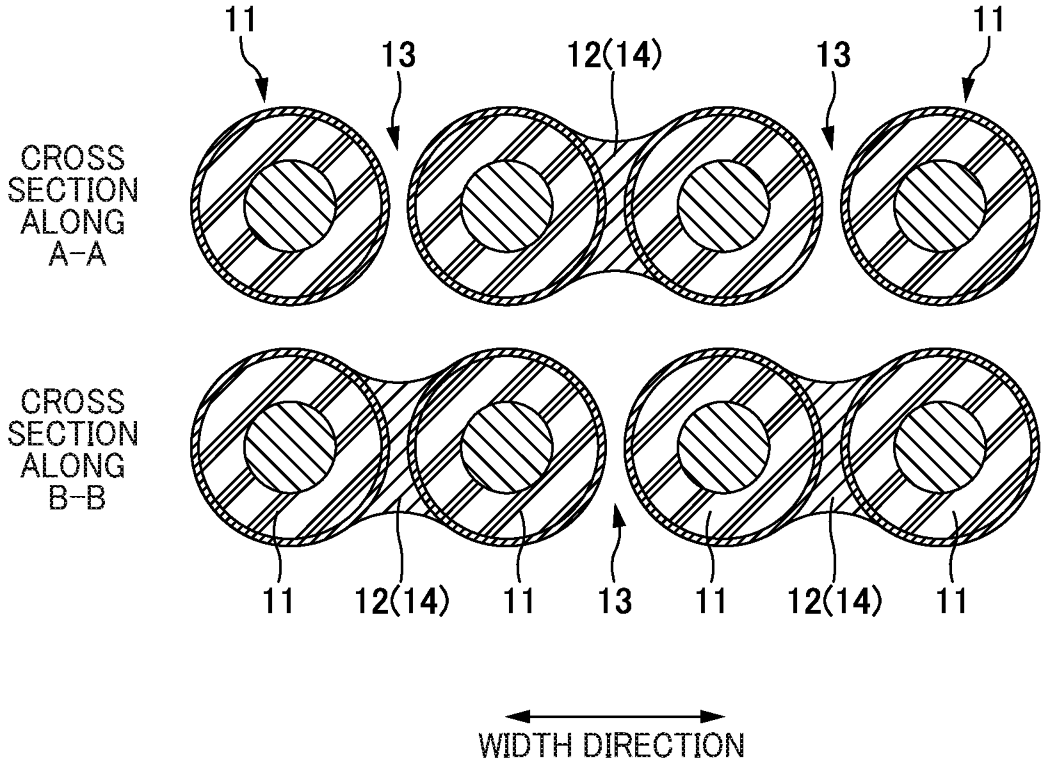
FIG. 1B is a cross-sectional view of the intermittently-connected optical fiber ribbon.

FIG. 1A is a perspective view of an intermittently-connected optical fiber ribbon 1. FIG. 1B is a cross-sectional view of the intermittently-connected optical fiber ribbon 1.

In the description below, as illustrated in FIG. 1A, "length direction" refers to the direction parallel to a plurality of optical fibers 11 in a state where the optical fibers 11 constituting an optical fiber ribbon 1 are lined up side by side substantially parallel to one another on a plane (i.e., the state illustrated in FIG. 1A). "Width direction" refers to the direction in which the plurality of optical fibers 11 are lined up in the state illustrated in FIG. 1A. "Ribbon thickness direction" refers to the direction perpendicular to the ribbon surface of the optical fiber ribbon 1 in the state illustrated in FIG. 1A.

The optical fiber ribbon 1 of one or more embodiments is a so-called intermittently-connected (intermittently-fixed) optical fiber ribbon. The intermittently-connected optical fiber ribbon 1 is an optical fiber ribbon in which a plurality of optical fibers 11 are lined up side by side and connected intermittently. Two adjacent optical fibers 11 are connected by connection parts 12. The plurality of connection parts 12 connecting the two adjacent optical fibers 11 are located intermittently in the length direction. The plurality of connection parts 12 of the optical fiber ribbon 1 are intermittently located two-dimensionally in the length direction and the width direction. For example, the connection parts 12 may be formed by applying a UV-curable resin (connecting agent 14) and then curing the resin by irradiation of UV rays. Regions other than the connection parts 12 between the two adjacent optical fibers 11 constitute non-connected parts 13 (separated parts). The connection parts 12 and non-connected parts 13 are lined up alternately between two adjacent optical fibers 11. At the non-connected parts 13, the two adjacent optical fibers 11 are not restrained together. The non-connected part 13 is located in the ribbon width direction of the connection part 12. The optical fiber ribbon 1 can be rolled up into a tubular form (bundle form) or folded, and thus, a multitude of optical fibers 11 can be accommodated at high densities.

It should be noted that the intermittently-connected optical fiber ribbon 1 is not limited to the configuration illustrated in FIGS. 1A and 1B. For example, the number of optical fibers 11 may be changed. Also, the layout of the intermittently-disposed connection parts 12 may be changed. Further, instead of intermittently connecting each of the optical fibers, a plurality of (e.g., two) optical fibers may be made into a set, and each of the sets may be connected intermittently. Furthermore, the optical fiber ribbon 1 illustrated in the figure has identification marks 15, but the optical fiber ribbon 1 does not have to include an identification mark 15. Further, the optical fibers 11 do not have to be connected with a UV-curable resin. For example, the optical fibers 11 may be connected with a thermoplastic resin or a thermosetting resin.

Figure 2A:
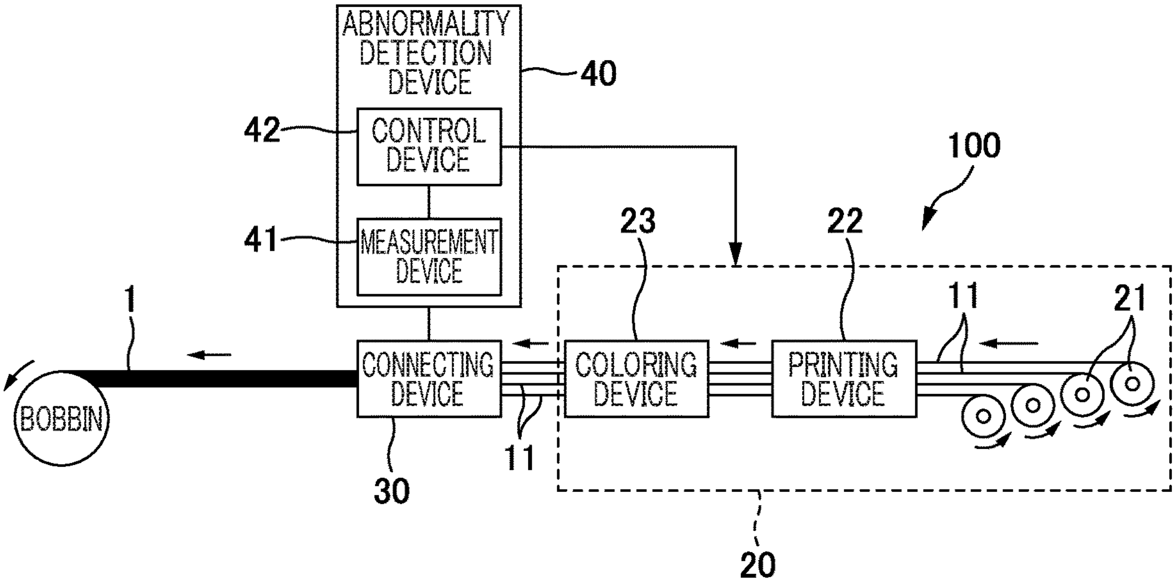
FIG. 2A is an explanatory diagram of a manufacturing system according to a first example.

Method for Manufacturing Optical Fiber Ribbon:

FIG. 2A is an explanatory diagram of a manufacturing system 100.

The manufacturing system 100 is a system for manufacturing an intermittently-connected optical fiber ribbon 1. The manufacturing system 100 includes a fiber supply device 20 and a connecting device 30. It should be noted that the manufacturing system 100 of one or more embodiments also includes an abnormality detection device 40.

The fiber supply device 20 is a device configured to supply a plurality of optical fibers 11 to the connecting device 30. The fiber supply device 20 includes a plurality of supply sources 21, a printing device 22, and a coloring device 23. The supply source 21 is a device configured to supply an optical fiber 11 before a coloring layer has been formed thereon. The printing device 22 is a device configured to print an identification mark 15 on the optical fiber 11. It should be noted that, in cases where no identification mark 15 is to be formed on the optical fiber ribbon 1, then the manufacturing system 100 does not have to include a printing device 22. The coloring device 23 is a device configured to form a coloring layer on the optical fiber 11. The coloring device 23 is configured to color each of the optical fibers 11 respectively with predetermined identification colors. It should be noted that already-colored optical fibers 11 may be supplied from the supply sources 21 to the connecting device 30, or, the optical fibers 11 do not necessarily have to be colored. In these cases, the manufacturing system 100 does not have to include a coloring device 23.

The connecting device 30 is a device configured to manufacture an intermittently-connected optical fiber ribbon 1 by intermittently forming connection parts 12 between the optical fibers 11. The connecting device 30 may also be referred to as a ribbon manufacturing device or a ribbon-forming device.

Figure 2B:
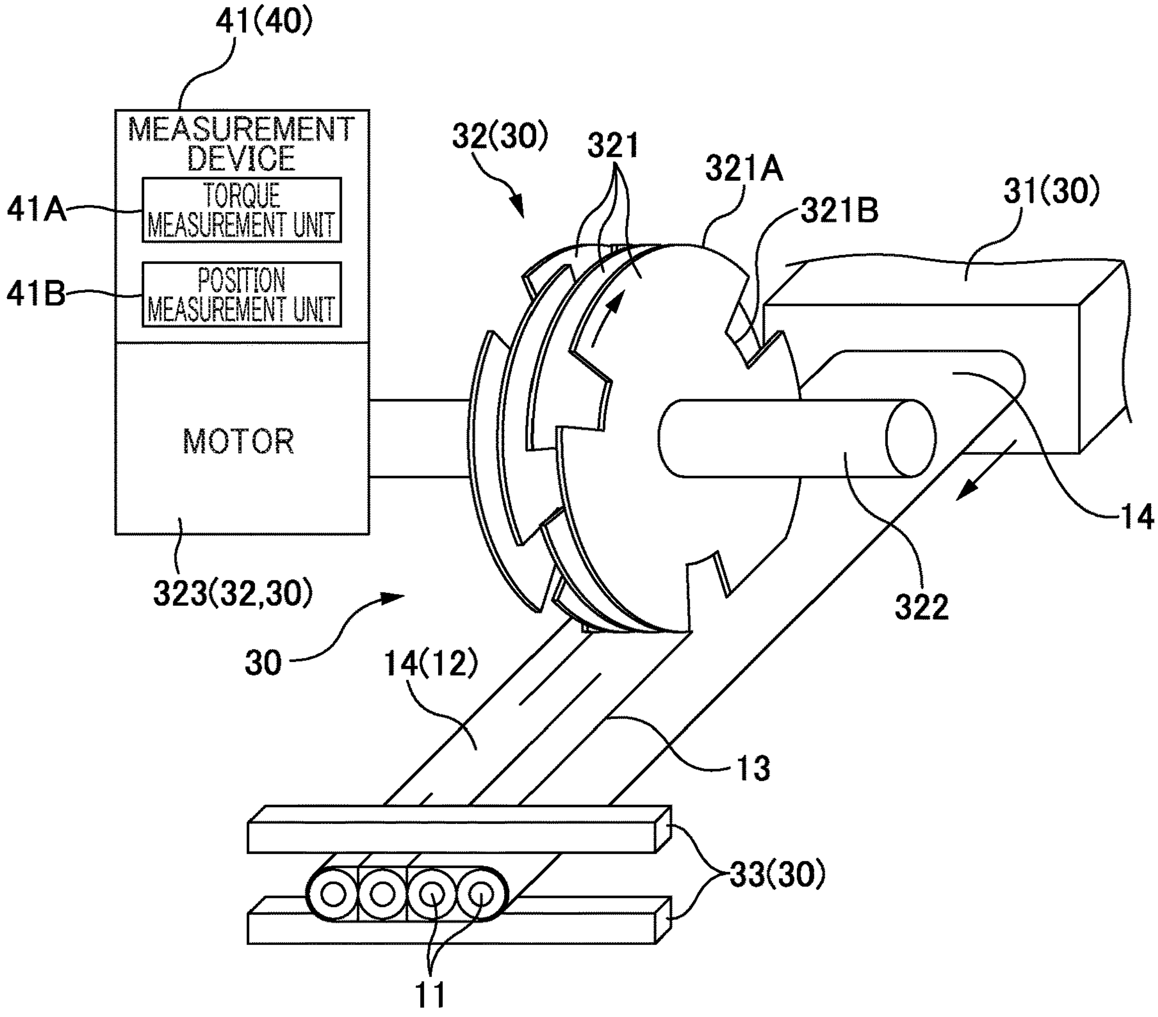
FIG. 2B is an explanatory diagram of a connecting device.

FIG. 2B is an explanatory diagram of a connecting device 30. The connecting device 30 illustrated in the figure includes an application unit 31, a separating unit 32, and a curing unit 33.

The application unit 31 is a device configured to apply a liquid connecting agent 14 (UV-curable resin) between adjacent optical fibers 11. The application unit 31 illustrated in the figure includes a coating die (not illustrated). The interior of the coating die is filled with the connecting agent 14 (UV-curable resin). When the plurality of optical fibers 11 pass through the coating die, the connecting agent 14 is applied to the circumference of the optical fibers 11 and between the optical fibers 11. In this example, the application unit 31 is configured to apply the connecting agent 14 continuously in the length direction between the optical fibers 11.

The separating unit 32 is a device configured to intermittently separate the optical fibers 11. In this example, the separating unit 32 is a device (removal unit) configured to remove a portion of the liquid connecting agent 14 applied between the optical fibers 11, while leaving on a portion of the connecting agent. The separating unit 32 illustrated in the figure includes a plurality of rotary blades 321. The rotary blade 321 is a member configured to intermittently remove the connecting agent 14 applied between the optical fibers 11. The rotary blades 321 rotate at a predetermined rotation speed in accordance with the transportation speed of the optical fibers 11. Protrusion parts 321A and recess parts 321B are formed in the peripheral edge of the rotary blade 321. The protrusion part 321A is inserted between the optical fibers 11, and thereby the connecting agent 14 is removed from between the optical fibers 11. At the recess part 321B, the peripheral edge of the rotary blade 321 is not inserted between the optical fibers 11, and thus, the connecting agent 14 between the optical fibers 11 remains. As a result, parts where the connecting agent 14 has remained (i.e., parts where the protrusion parts 321A of the rotary blade 321 were not inserted; first parts) and parts where the connecting agent 14 has been removed (i.e., parts where the protrusion parts 321A of the rotary blade 321 were inserted; second parts) are formed alternately between the optical fibers 11. In other words, a state is achieved wherein the connecting agent 14 has been applied intermittently between the optical fibers 11.

It should be noted that the separating unit 32 is not limited to the configuration employing the rotary blades 321. For example, the separating unit 32 may remove the connecting agent 14 by using suction openings configured to suck the connecting agent 14. Note, however, that in this case, there is a need to control the intermittent suction via the suction openings (i.e., the removal of the connecting agent 14), which makes it difficult to increase the transportation speed (linear speed) of the optical fibers 11. In contrast, in one or more embodiments, it is possible to remove a portion of the connecting agent 14, while leaving on a portion of the connecting agent, simply by rotating the rotary blades 321 of the separating unit 32, thus making it easy to apply the connecting agent 14 even when the transportation speed of the optical fibers 11 is increased. Further, the separating unit is not limited to a device (removal unit) configured to remove the connecting agent 14 (see, for example, the separating unit 34 described further below).

As described above, the connecting device 30 illustrated in FIG. 2B uses the application unit 31 and the separating unit 32 to apply the connecting agent 14 intermittently between the optical fibers. Note, however, that the connecting device 30 is not limited to a configuration using the application unit 31 and the separating unit 32. For example, the connecting device 30 may use a dispenser to apply the connecting agent 14 intermittently between the optical fibers, as described further below. However, in cases of intermittently applying the connecting agent 14 with a dispenser, there is a need to control the discharging/non-discharging of the connecting agent 14 from the dispenser, which makes it difficult to increase the transportation speed (linear speed) of the optical fibers 11. In contrast, using the application unit 31 and the separating unit 32, as in one or more embodiments, makes it possible to apply the connecting agent 14 intermittently between the optical fibers, even when the transportation speed of the optical fibers 11 is increased.

The curing unit 33 is a device configured to cure the connecting agent 14. In this example, the connecting agent 14 is a UV-curable resin, and hence, the curing unit 33 is a UV irradiation device. Curing the connecting agent 14 applied between two adjacent optical fibers 11 forms the connection parts 12 that connect the two adjacent optical fibers 11. It should be noted that the parts from which the connecting agent 14 has been removed become the non-connected parts 13. (That is, the separating unit 32 intermittently removes the connecting agent 14 from between the optical fibers 11, to thereby intermittently separate the optical fibers 11 and thus form the non-connected parts 13 intermittently between the optical fibers 11.)

The connecting device 30 (more specifically, the separating unit 32) illustrated in FIG. 2B includes a plurality of rotary blades 321, a shaft 322, and a motor 323. The plurality of rotary blades 321 are located side by side in the width direction, and are supported by a common shaft 322. The shaft 322 is a member serving as a rotation axis of the rotary blades 321. The motor 323 is a driving device configured to rotate the shaft 322. For the sake of brevity, the output shaft of the motor 323 in the figure is disposed directly on the shaft 322, but the motor 323 may rotate the shaft 322 via gears (not illustrated). It should be noted that, as will be described further below, the connecting device 30 includes guides 324 (see FIG. 5A) configured to guide the rotary blades 321. Note that the plurality of rotary blades 321 do not have to be located side by side on the same shaft. For example, the plurality of rotary blades 321 may be located on different shafts, respectively.

Abnormality Detection:

In cases where abnormalities are to be detected by inspecting an optical fiber ribbon 1 after manufacture (after completion), then it will not be possible to detect the abnormalities until those abnormalities appear in the shape or appearance of the optical fiber ribbon 1, which may lead to a delay in abnormality detection. So, in one or more embodiments, abnormalities are detected during manufacturing of the optical fiber ribbon 1, to enable early abnormality detection. Further, in one or more embodiments, it is possible to detect indications of abnormalities before abnormalities actually appear in the shape or appearance of the optical fiber ribbon 1 after manufacture (after completion).

An abnormality detection device 40 is a device configured to detect abnormalities during manufacturing of an intermittently-connected optical fiber ribbon 1 (see FIG. 2A). As described below, the abnormality detection device 40 is configured to measure a load of the connecting device 30 when intermittently forming the connection parts 12, and to detect abnormalities based on the measured load. The abnormality detection device 40 includes a measurement device 41 and a control device 42.

The measurement device 41 is a device configured to measure a load of the connecting device 30 when the connecting device 30 intermittently forms the connection parts 12 between the optical fibers 11. The measurement device 41 illustrated in FIG. 2A is configured to measure a torque of the motor 323, as the load of the connecting device 30. Further, in one or more embodiments, the measurement device 41 is configured to measure the torque of the motor 323 while measuring the rotation position of the rotary blades 321. Therefore, the measurement device 41 includes a torque measurement unit 41A and a position measurement unit 41B. The torque measurement unit 41A is configured to measure the torque of the motor 323. The position measurement unit 41B is configured to measure the rotation position of the rotary blades 321. The position measurement unit 41B is, for example, a rotary encoder. In cases where the motor 323 is configured to rotate the shaft 322 via gears (not illustrated), then the position measurement unit 41B may directly measure the rotation position of the rotary blades 321 (or the shaft 322), or may indirectly measure the rotation position of the rotary blades 321 by measuring the rotation position of the output shaft of the motor 323. The measurement device 41 may measure the torque of the motor 323 without measuring the rotation position of the rotary blades 321. The measurement device 41 outputs the measurement results (in this example, the torque of the motor 323 and the rotation position of the rotary blades 321) to the control device 42. It should be noted that, in cases where the plurality of rotary blades 321 are located respectively on different shafts, the measurement device 41 may measure the torque of each of the motors rotating the respective shafts, and may output the total torque of the plurality of motors to the control device 42 as the measurement result, or may output the respective torques of the plurality of motors to the control device 42 as the measurement result.

The control device 42 is a device configured to control the abnormality detection device 40. For example, the control device 42 is constituted by a computer, and includes, for example, an arithmetic processing device and a storage device as hardware. For example, the arithmetic processing device is constituted by a CPU etc. For example, the storage device is constituted by a main storage device such as a RAM etc., and an auxiliary storage device such as a hard disk drive, an SSD, etc. The arithmetic processing device reads out and executes programs stored in the storage device, to thereby execute the various processes described below. It should be noted that the storage device includes a non-transitory storage medium which stores programs for making the arithmetic processing device execute the various processes described below. It should be noted that the control device 42 of one or more embodiments is also capable of controlling the fiber supply device 20 and the connecting device 30. For example, when the control device 42 detects an abnormality (described below), the control device can stop the fiber supply device 20 and the connecting device 30.

Figure 3:
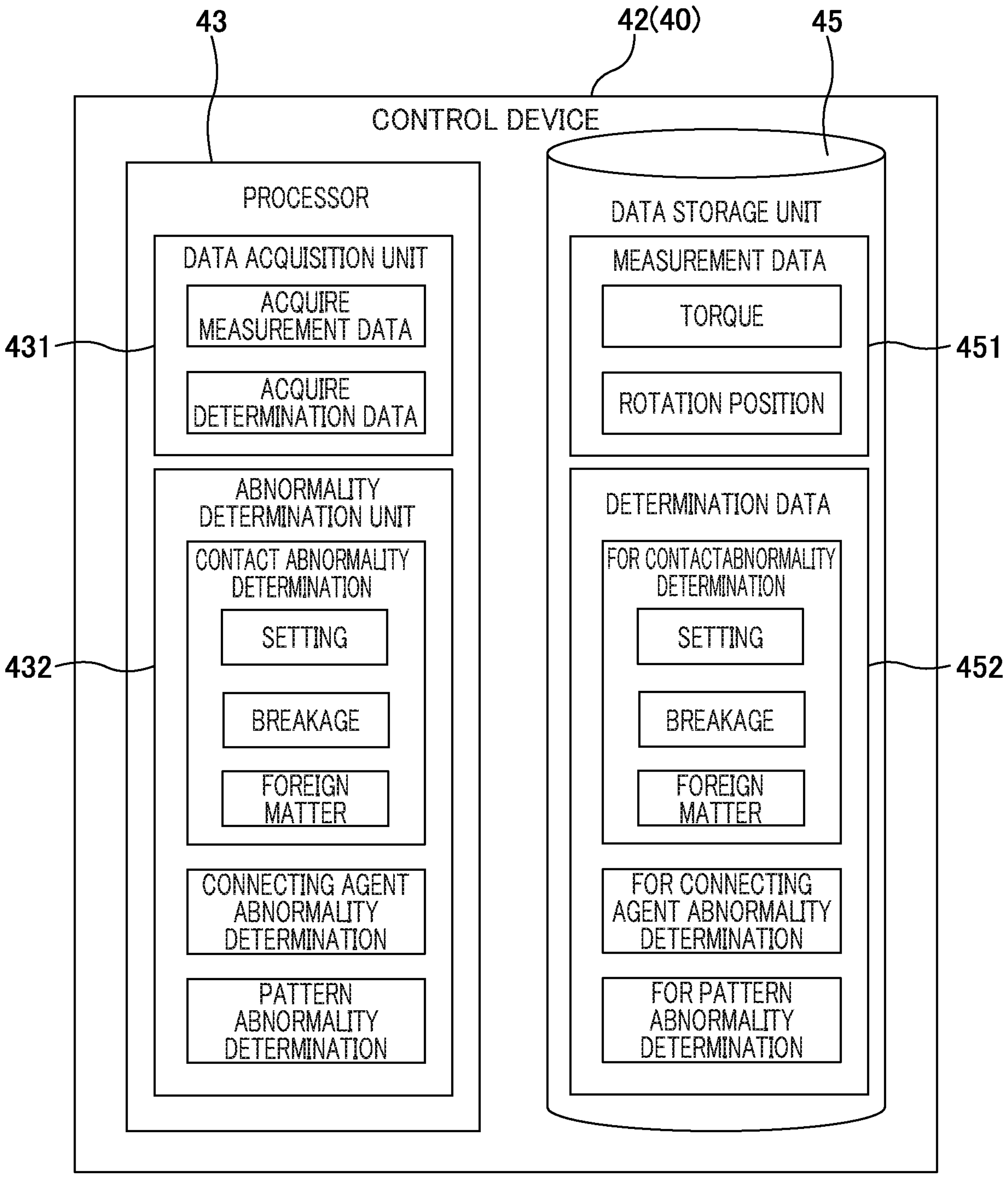
FIG. 3 is a block diagram illustrating functions of a control device.

FIG. 3 is a block diagram illustrating functions of a control device 42.

The control device 42 includes a processor 43 and a data storage unit 45. The processor 43 is implemented by the arithmetic processing device executing a control program stored in the storage device to thereby perform various types of control. The processor 43 includes a data acquisition unit 431 and an abnormality determination unit 432.

The data acquisition unit 431 is configured to acquire various types of data, and store the acquired data in the data storage unit 45. For example, the data acquisition unit 431 acquires measurement results from the measurement device 41, and stores data related to the measurement results (measurement data 451; for example, the torque of the motor 323, the rotation position of the rotary blade 321, etc.) in the data storage unit 45. Based on the measurement data 451, the data acquisition unit 431 calculates data for determining abnormality (determination data 452; for example, a threshold), and stores the determination data 452 in the data storage unit 45.

The abnormality determination unit 432 determines abnormalities based on the measurement data 451. It should be noted that the abnormality determination unit 432 may not only determine whether or not there are abnormalities, but may also determine the types of abnormalities. For example, as will be described further below, based on the measurement data 451, the abnormality determination unit 432 may determine abnormalities in the state of contact of the rotary blades 321 (contact abnormality determination), or determine abnormalities in the connecting agent 14 (connecting agent abnormality determination), or determine abnormalities in a layout pattern of the connection parts 12 (pattern abnormality determination). The abnormality determination process of the abnormality determination unit 432 will be described further below.

The data storage unit 45 is a storage unit configured to store predetermined data. The data storage unit 45 is implemented mainly by a part of a storage region of the storage device. In this example, the data storage unit 45 stores the measurement data 451 and the determination data 452. The measurement data 451 is data related to measurement results (for example, the torque of the motor 323 (the load of the connecting device 30), the rotation position of the rotary blade 321, etc.). The determination data 452 is data for determining abnormalities, and is a threshold, for example. The determination data 452 may be data indicating a predetermined value (initial value), or may be data calculated by the data acquisition unit 431 based on the measurement data 451 (i.e., data that is updated continually). The determination data 452 will be described further below.

Figure 4:
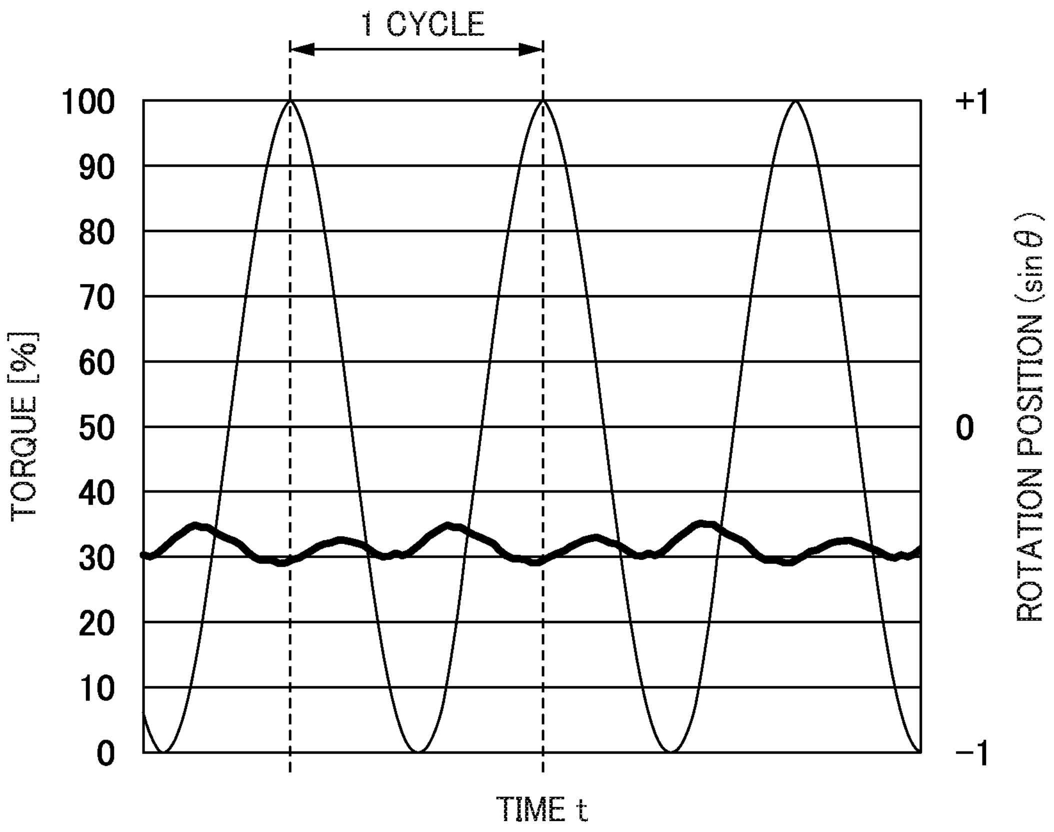
FIG. 4 is an explanatory diagram of measurement data.

FIG. 4 is an explanatory diagram of the measurement data 451. The horizontal axis indicates time. The vertical axis on the left side indicates torque. In this example, the maximum torque of the motor 323 is defined as 100%, and torque values are shown as numerical values ranging from 0 to 100%. The vertical axis on the right side indicates the rotation position (phase) of the rotary blade 321 as numerical values ranging from −1 to +1 in terms of sin θ, where θ is defined as the angle of rotation of the rotary blade 321 with respect to a reference position. The graph shown by the bold line in the figure indicates the change in torque over time. The graph shown by the thin line in the figure indicates the change over time in the rotation position of the rotary blade 321. When the rotary blade 321 rotates at a predetermined rotation speed, the thin-line graph illustrates a sine curve. A single cycle of the thin-line graph is equivalent to a single rotation of the rotary blade 321.

The figure shows the measurement data for normal times (i.e., in a state that is not abnormal). As described above, the connecting agent 14 between the optical fibers 11 is removed by inserting the protrusion part 321A of the rotary blade 321 between the optical fibers 11. When the protrusion part 321A of the rotary blade 321 removes the connecting agent 14, the load applied on the rotary blade 321 increases, and hence, the torque becomes relatively high. Conversely, when the rotary blade 321 is not inserted between the optical fibers 11 because of the presence of the recess part 321B, the load applied on the rotary blade 321 decreases, and hence, the torque becomes relatively low. As a result, during normal times, the torque changes over time periodically within a predetermined numerical range, as shown by the bold line in the figure.

Based on the measurement data 451, the abnormality determination unit 432 determines abnormalities in the state of contact of the rotary blades 321 (contact abnormality determination). As will be described below, if the torque indicated by the measurement data 451 is high, the abnormality determination unit 432 determines that there is an abnormality in the state of contact of the rotary blade 321. Further, the abnormality determination unit 432 determines whether the abnormality in the state of contact of the rotary blade 321 is an abnormality in initial setting of the rotary blade 321, or an abnormality due to breakage of the rotary blade 321, or an abnormality due to foreign matter. This will be described below.

Figure 5B:
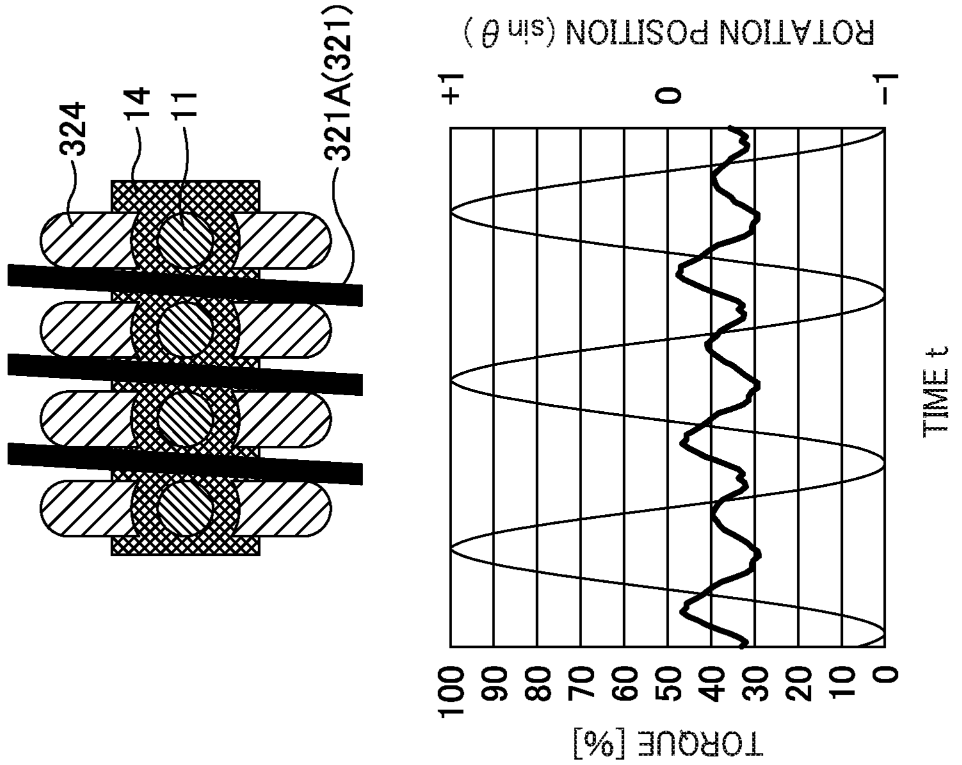
FIG. 5B is an explanatory diagram illustrating a state when there are abnormalities in initial setting.
Figure 5A:
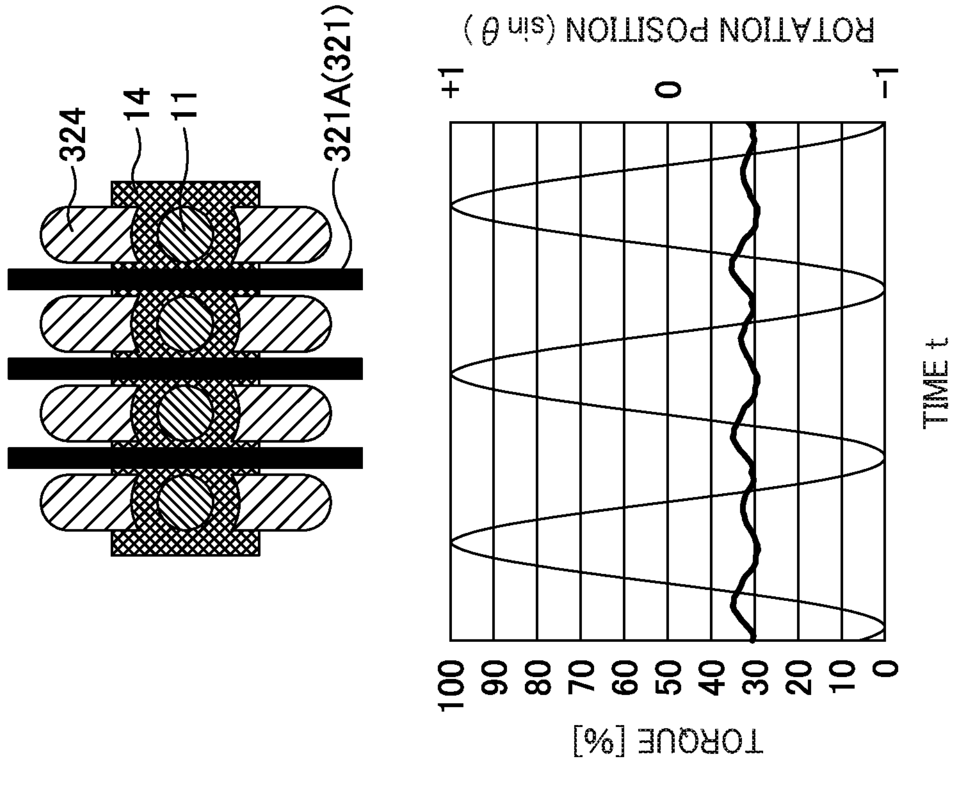
FIG. 5A is an explanatory diagram illustrating a state at normal times.

FIG. 5A is an explanatory diagram illustrating a state at normal times. FIG. 5B is an explanatory diagram illustrating a state when there are abnormalities in initial setting. In each figure, the upper diagram illustrates a cross-sectional view (a cross-sectional view perpendicular to the length direction) of a part in which the protrusion parts 321A of the rotary blades 321 are inserted between the optical fibers 11. Guides 324 configured to guide the protrusion parts 321A are located on both sides of the rotary blade 321 in the width direction. The plurality of guides 324 are located side by side with intervals therebetween in the width direction. The protrusion part 321A of the rotary blade 321 is inserted between the guides 324, and is thus inserted between the optical fibers 11. The lower diagram in FIGS. 5A and 5B illustrates a graph of measurement data.

As illustrated in FIG. 5B, if there is an abnormality in the setting of the rotary blades 321, the protrusion parts 321A of the rotary blades 321 may come into contact with the guides 324. For example, the rotary blades 321 (particularly the protrusion parts 321A) may come into contact with the guides 324 in cases where the rotary blades 321 are mounted obliquely with respect to the shaft 322, or in cases where the shaft 322 is mounted obliquely with respect to the guides 324. In cases where the rotary blades 321 come into contact with the guides 324 due to abnormalities in the initial setting, the torque becomes relatively high continuously from the initial stage compared to normal times. So, the abnormality determination unit 432 compares the torque indicated by the measurement data 451 with a threshold (a threshold for detecting abnormalities in setting) indicated by the determination data 452 in the data storage unit 45, and if the torque indicated by the measurement data 451 is higher than the threshold continuously from the initial stage, the abnormality determination unit determines that there is an abnormality in the initial setting of the rotary blades 321. For example, the abnormality determination unit 432 calculates the maximum value of the torque based on the measurement data 451, and compares the maximum value of the torque with the threshold (threshold for detecting abnormalities in setting) indicated by the determination data 452 in the data storage unit 45, and determines that there is an abnormality in the initial setting of the rotary blades 321 in cases where the calculated maximum value of the torque is higher than the threshold continuously from the initial stage. It should be noted that, instead of calculating the maximum value of the torque, the abnormality determination unit 432 may, for example, calculate the average value or amplitude of the torque, and determine abnormalities by comparing the calculated value with a threshold.

Figure 6C:
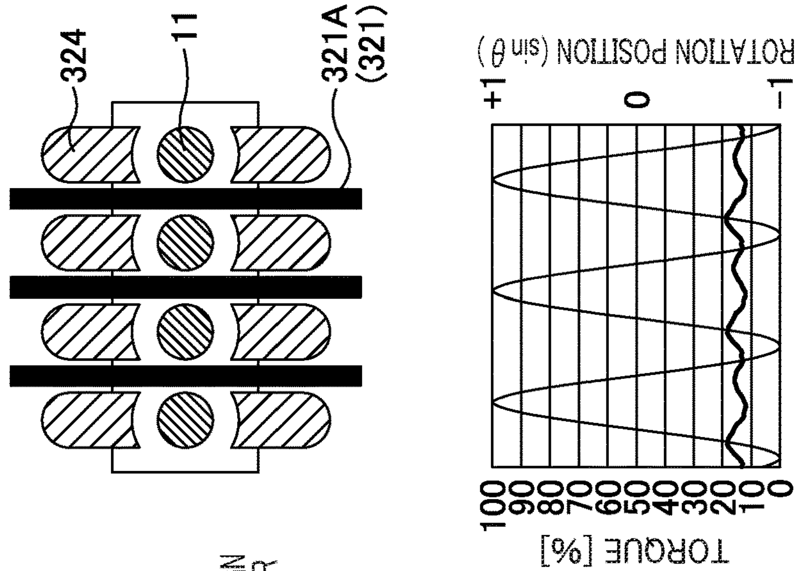
FIG. 6C is an explanatory diagram illustrating a case where a connecting agent has run out.
Figure 6B:
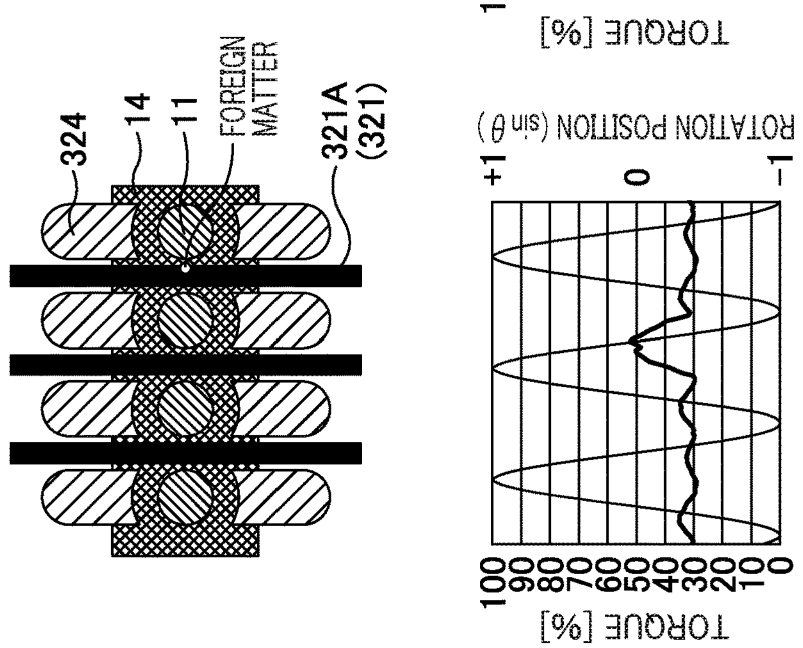
FIG. 6B is an explanatory diagram illustrating a state when there are abnormalities due to foreign matter.
Figure 6A:
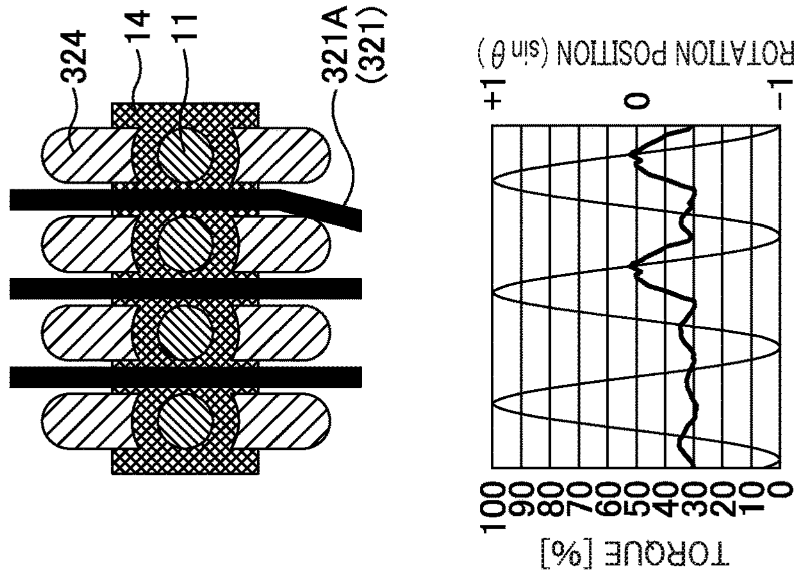
FIG. 6A is an explanatory diagram illustrating a state when there are abnormalities due to breakage of a rotary blade.

FIG. 6A is an explanatory diagram illustrating a state when there are abnormalities due to breakage of a rotary blade 321. FIG. 6B is an explanatory diagram illustrating a state when there are abnormalities due to foreign matter.

As illustrated in FIG. 6A, in cases where a rotary blade 321 has broken (for example, in cases where a rotary blade 321 has become bent), the rotary blade 321 (particularly the protrusion part 321A) may come into contact with the guide 324 from the moment of breakage. So, in cases where the rotary blade 321 has broken, the torque (for example, the maximum value of the torque) becomes high continuously from the moment of breakage, as illustrated in FIG. 6A.

On the other hand, as illustrated in FIG. 6B, in cases where the rotary blade 321 has come into contact with foreign matter, the torque increases at the timing that the rotary blade 321 comes into contact with the foreign matter. Examples of foreign matter that may contact the rotary blade 321 include dust included in the connecting agent 14, an optical fiber 11 (for example, an abnormally thick identification mark 15), etc. The foreign matter increases the torque, but after the foreign matter is transported together with the optical fiber 11, the torque returns to a normal state. Therefore, in cases where the rotary blade 321 comes into contact with foreign matter, the torque increases locally, as illustrated in FIG. 6B.

So, the abnormality determination unit 432 compares the torque indicated by the measurement data 451 with the threshold indicated by the determination data 452 in the data storage unit 45. If a state in which the torque exceeds the threshold continues for a predetermined period of time (for example, for several cycles), the abnormality determination unit 432 determines that there is an abnormality due to breakage of a rotary blade 321. If a state in which the torque exceeds the threshold does not continue (the torque exceeds the threshold and then drops below the threshold), the abnormality determination unit 432 determines that there is an abnormality due to inclusion of foreign matter. It should be noted that the abnormality determination unit 432 may calculate the maximum value of the torque (or the average value or amplitude of the torque) based on the measurement data 451, and compare the calculated torque value with the threshold.

As described above, the abnormality determination unit 432 can determine whether the abnormality in the state of contact of the rotary blade 321 is an abnormality in initial setting of the rotary blade 321, or an abnormality due to breakage of the rotary blade 321, or an abnormality due to foreign matter. Note, however, that the abnormality determination unit 432 may determine other contact abnormalities as abnormalities in the state of contact of the rotary blade 321. Further, the abnormality determination unit 432 may determine other abnormalities different from abnormalities in the state of contact of the rotary blade 321. For example, as described below, the abnormality determination unit 432 may determine abnormalities in the connecting agent 14 or abnormalities in the layout pattern of the connection parts 12.

FIG. 6C is an explanatory diagram illustrating a case where the connecting agent 14 has run out. When the connecting agent 14 has run out, the rotary blades 321 will not receive any load from the connecting agent 14, and thus, the torque decreases. So, the abnormality determination unit 432 compares the torque indicated by the measurement data 451 with the threshold (threshold for determining abnormalities in the connecting agent 14) indicated by the determination data 452 in the data storage unit 45. If a state in which the torque is below the threshold continues, the abnormality determination unit determines that there is an abnormality due to connecting agent depletion. It should be noted that the abnormality determination unit 432 may calculate, for example, the average value of variations in torque over time or an extreme value (maximum value or minimum value) of the torque, and compare the calculated value (the average value, the extreme value, etc.) with a threshold, to determine abnormalities related to connecting agent depletion. Further, the abnormality determination unit 432 may not only determine the presence/absence of the connecting agent 14, but may also determine abnormalities in the viscosity of the connecting agent 14 based on the measurement data 451.

Figure 7B:
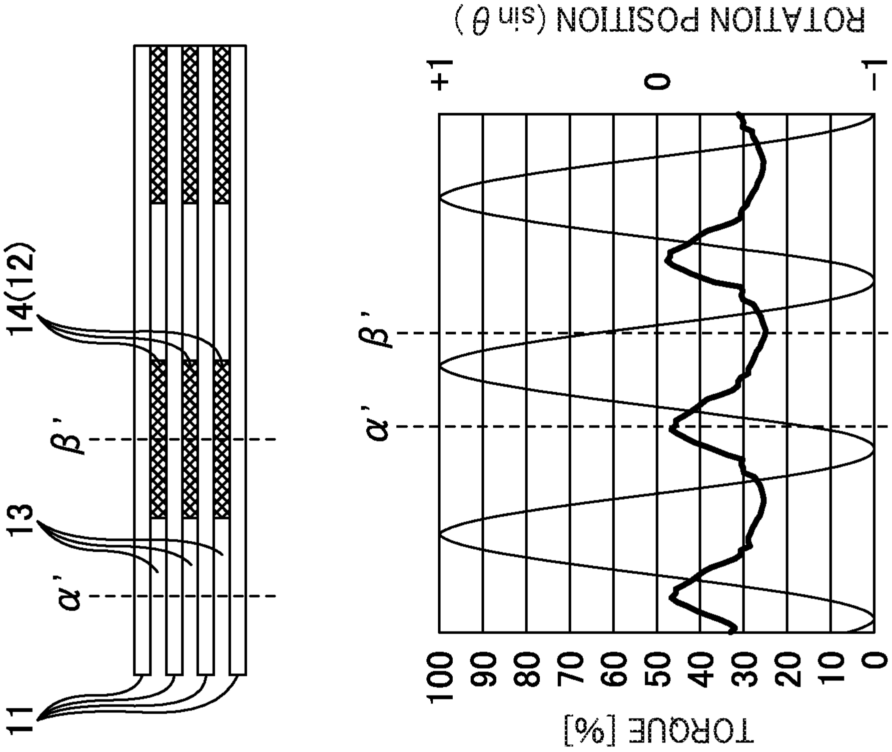
FIG. 7B is an explanatory diagram illustrating a state when there are abnormalities in the layout pattern of connection parts.
Figure 7A:
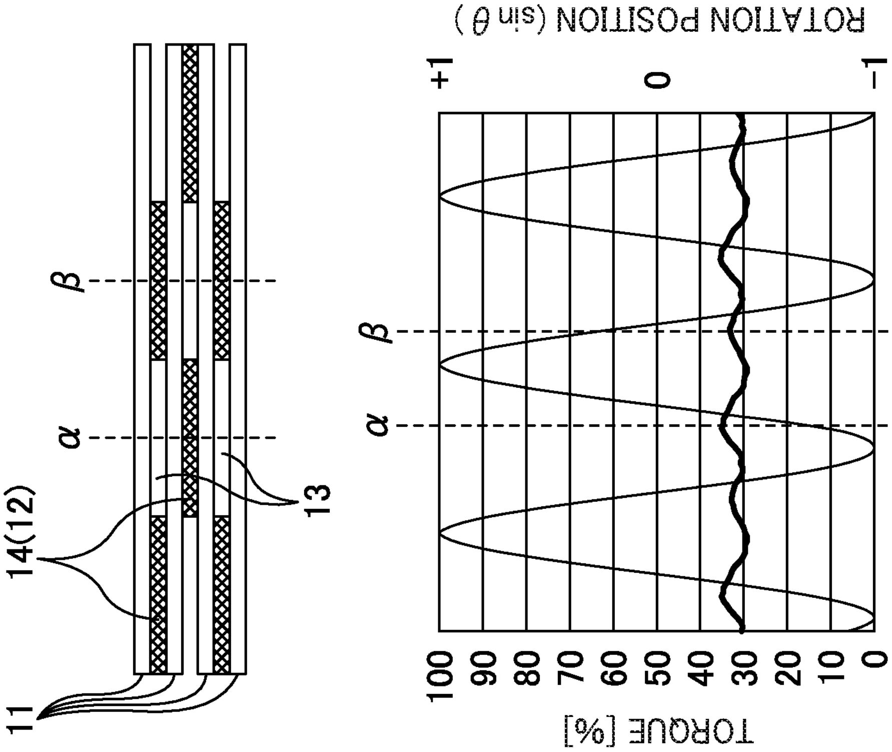
FIG. 7A is an explanatory diagram illustrating a state when a layout pattern of connection parts is normal.

FIG. 7A is an explanatory diagram illustrating a state when a layout pattern of the connection parts 12 is normal. FIG. 7B is an explanatory diagram illustrating a state when there are abnormalities in the layout pattern of the connection parts 12. In each figure, the upper diagram illustrates a layout pattern of the intermittently-formed connection parts 12, whereas the lower diagram illustrates a graph of the measurement data.

At position a in the upper diagram of FIG. 7A, a single connection part 12 and two non-connected parts 13 are formed in the width direction. At the position a, the protrusion parts 321A of two rotary blades 321, among the three rotary blades 321, are inserted between the optical fibers 11, and thus, the two rotary blades 321 receive resistance. In contrast, at position ß in the upper diagram of FIG. 7A, two connection parts 12 and a single non-connected part 13 are formed in the width direction. At the position B, the protrusion part 321A of a single rotary blade 321, among the three rotary blades 321, is inserted between the optical fibers 11, and thus, the single rotary blade 321 receives resistance. That is, at the position B, the load applied to the three rotary blades 321 is smaller compared to the position a. As described above, the load applied to the three rotary blades 321 increases or decreases depending on the number of non-connected parts 13 lined up in the width direction. When the layout (pattern) of the intermittently-formed connection parts 12 is normal, the torque also changes over time according to a predetermined pattern. Further, the torque changes over time in predetermined cycles in synchronization with the rotation position of the rotary blades 321, and hence, when the layout (pattern) of the intermittently-formed connection parts 12 is normal, the torque takes on an extreme value (maximum value or minimum value) when the rotary blades 321 are located at a predetermined rotation position.

The upper diagram of FIG. 7B illustrates a layout (pattern) of the connection parts 12 when there are abnormalities. In FIG. 7B, for the sake of explanation, the layout of the connection parts 12 during abnormalities is made exaggeratedly different from that during normal times.

When there are abnormalities in the layout of the intermittently-formed connection parts 12, the load applied to the three rotary blades 321 increases/decreases at timings different from normal times. As a result, in cases where there are abnormalities in the layout of the intermittently-formed connection parts 12, the torque changes over time according to a pattern different from that during normal times. For example, in cases where there are abnormalities in the layout of the connection parts 12, the rotation position of the rotary blades 321 when the torque takes on an extreme value (maximum value or minimum value) deviates from that during normal times. It should be noted that, even in cases where the layout of the connection parts 12 does not deviate as extremely as shown in FIG. 7B, the torque will change over time according to a pattern different from that during normal times if the layout of the connection parts 12 is different from that during normal times.

So, the abnormality determination unit 432 determines whether or not there are abnormalities in the layout (pattern) of the connection parts 12 based on the torque and the rotation position indicated by the measurement data 451. For example, based on the torque and the rotation position indicated by the measurement data 451, the abnormality determination unit 432 calculates the rotation position of the rotary blades 321 at which the torque takes on an extreme value (maximum value or minimum value), and if the rotation position of the rotary blades 321 at which the torque takes on the extreme value is different from that during normal times, the abnormality determination unit determines that there is an abnormality in the layout of the connection parts 12. It should be noted that the abnormality determination unit 432 may calculate the number of extreme values (maximum values and/or minimum values) of the torque during a single cycle (the period during which the rotary blades 321 rotate once), and may determine that there is an abnormality in the layout of the connection parts 12 if the number of extreme values is different from that during normal times. Alternatively, the abnormality determination unit 432 may calculate a plurality of rotation positions of the rotary blades 321 at which the torque takes on extreme values (maximum values or minimum values) during a single cycle and may further calculate the difference between the rotation position of the rotary blades 321 corresponding to one extreme value and the rotation position of the rotary blades 321 corresponding to another extreme value (i.e., may calculate the angle of rotation of the rotary blades 321), and may determine that there is an abnormality in the layout of the connection parts 12 if the difference between two rotation positions is different from that during normal times. It should be noted that the abnormality determination unit 432 may determine abnormalities in the layout of the connection parts 12 without calculating extreme values of the torque. For example, the abnormality determination unit 432 may subject the torque indicated by the measurement data 451 to fast Fourier transformation (FFT), and may determine abnormalities in the layout of the connection parts 12 based on the transformation result.

The control device 42 may detect abnormalities according to other methods. For example, the control device may detect abnormalities based on a determination model (another example of determination data 452) generated by machine learning. More specifically, in a training phase of machine learning, the control device 42 or an external computer acquires training data (teaching data) in which torque data is associated with presence/absence of abnormalities (or types of abnormalities), and generates, by machine learning, a learning model wherein input data is the torque in the training data and output data is the presence/absence of abnormalities (or types of abnormalities). In this way, a learned model is generated, wherein torque serves as input data and presence/absence of abnormalities (or types of abnormalities) becomes output data. The learned model generated by machine learning will be stored in the data storage unit as determination data 452. Then, in a determination phase, the control device 42 (the abnormality determination unit 432) employs the torque (the load of the connecting device 30) measured by the measurement device, as input data, to determine presence/absence of abnormalities (or types of abnormalities) by using the learned model stored as the determination data 452. In this way, abnormalities may be detected through machine learning.

Figure 8:
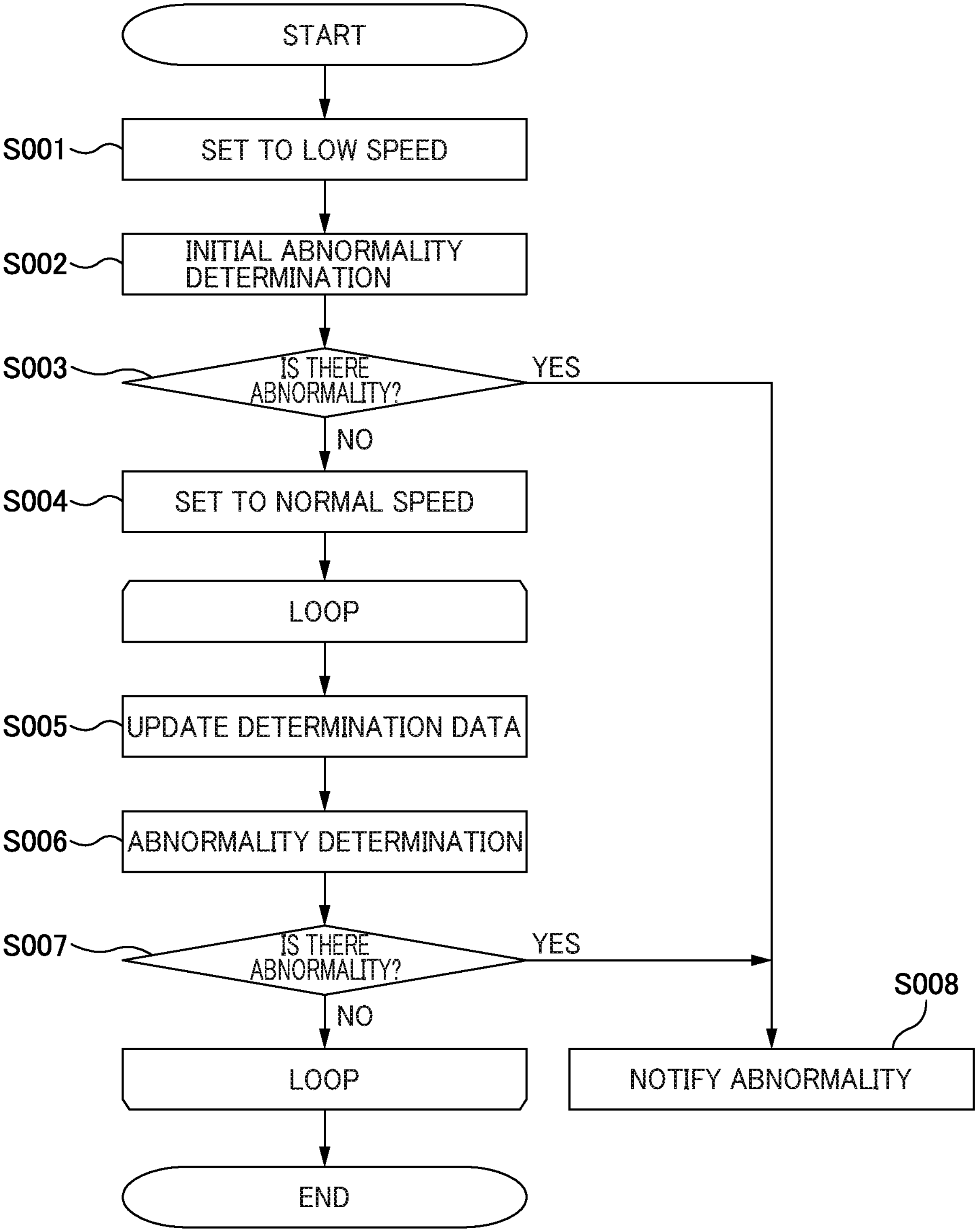
FIG. 8 is a flowchart illustrating an abnormality determination process.

FIG. 8 is a flowchart illustrating an abnormality determination process. The various processes shown in the figure are implemented by the control device 42 by making the arithmetic processing device read out and execute a program stored in the storage device.

First, at the time of starting manufacturing of an optical fiber ribbon 1, the control device 42 sets the transportation speed (linear speed) of optical fibers 11 to be supplied from the fiber supply device 20 to a relatively low speed V1, and sets the rotation speed of the rotary blades 321 to a relatively low rotation speed ω1 (S001). The manufacturing system 100 performs a test operation (first operation) at the relatively low transportation speed and rotation speed.

Next, the control device 42 (abnormality determination unit 432) measures the torque for when the rotary blades 321 are rotated at the rotation speed ω1, and based on measurement data 451 measured by the measurement device 41, determines whether there are initial abnormalities (S002). For example, based on the measurement data 451 of the torque of the motor 323, the abnormality determination unit 432 determines whether or not there are abnormalities in the initial setting (see FIG. 5B) or whether or not there are abnormalities in the connecting agent 14 (see FIG. 6C). At the time of this initial abnormality determination, initial determination data (determination data 452) indicating predetermined values (initial values) stored in the data storage unit 45 in advance will be used.

If there are no initial abnormalities ("No" at S003), then, in order to switch from the test operation (first operation) to normal operation (second operation), the control device 42 sets the transportation speed (linear speed) of the optical fibers 11 being supplied from the fiber supply device 20 to a predetermined speed V2, and sets the rotation speed of the rotary blades 321 to a predetermined rotation speed ω2 (S004). The speed V2 is the transportation speed of the optical fibers 11 during normal operation, and is faster than the speed V1 during the test operation (V2>V1). The rotation speed ω2 is the rotation speed of the rotary blades 321 during normal operation, and is faster than the rotation speed ω1 during the test operation (ω2>ω1). It should be noted that the torque of the motor 323 (the load of the connecting device 30) during normal operation (second operation) becomes greater than the torque of the motor 323 during the test operation (first operation). By transporting the optical fibers 11 at transportation speed V2, which is faster than the speed during the test operation, and rotating the rotary blades 321 at rotation speed ω2, which is faster than the speed during the test operation, it is possible to manufacture an optical fiber ribbon 1 at high speed.

During normal operation, the control device 42 (data acquisition unit 431) acquires measurement data 451 from the measurement device 41 in a state where the rotary blades 321 are being rotated at the rotation speed ω2, and updates determination data 452 (S005). For example, the control device 42 acquires data on torque worth a plurality of cycles in the measurement data 451, calculates a threshold for determining abnormalities, and stores the threshold in the data storage unit 45 as determination data 452. For example, the control device 42 calculates the threshold by multiplying a coefficient to the average value or maximum value of the torque obtained from 10 cycles in the measurement data 451.

Further, during normal operation, the control device 42 measures the torque for when the rotary blades 321 are being rotated at the rotation speed ω2, and executes abnormality determination based on the measurement data 451 acquired from the measurement device 41 (S006). For example, based on the measurement data 451 of the torque of the motor 323, the abnormality determination unit 432 determines whether or not there are abnormalities due to breakage of a rotary blade 321 (see FIG. 6A), or whether or not there are abnormalities due to foreign matter (see FIG. 6B), or whether or not there are abnormalities in the layout pattern of the connection parts 12 (FIG. 7B). At the time of determining abnormalities during normal operation, the determination data 452 (threshold) acquired in S005 will be used.

It should be noted that, at the time of determining abnormalities during normal operation (S006), it is also possible to use determination data 452 which indicates a predetermined value and is stored in advance in the data storage unit 45. In this case, there is no need to update the determination data 452 at S005. However, the torque of the motor 323 may vary depending on the environment (for example, the temperature and/or humidity) at the time of manufacture, and therefore, it is difficult to set the determination data 452 to an appropriate value in advance (or there may be an error in abnormality determination if abnormality determination is performed based on determination data 452 set in advance). In contrast, one or more embodiments first confirm that there is no initial abnormality at S002 and then acquires (updates) the determination data 452 based on the measurement data 451 obtained during normal times. In this way, it is possible to obtain determination data 452 which suits the environment at the time of manufacture, and thus perform abnormality determination appropriately.

It should be noted that, as described above, at the time of initial abnormality determination (S002), determination data 452 (initial determination data) stored in the data storage unit 45 in advance is used. However, during this initial abnormality determination, the transportation speed V1 of the optical fibers 11 and the rotation speed 1 of the rotary blades 321 are set to relatively low speed, and hence, the torque of the motor 323 is less prone to be affected by the environment. Therefore, at the time of initial abnormality determination (S002), it is permissible to use determination data 452 (initial determination data) indicating predetermined values (initial values) stored in the data storage unit 45 in advance.

If there is no abnormality ("No" at S007), the control device 42 will repeat S005 to S007 while manufacturing the optical fiber ribbon 1 (during normal operation). If there is an abnormality ("Yes" at S003 or S007), the control device 42 notifies the abnormality (S008). As an example of the abnormality notification process at S008, the control device 42 may display an abnormality message on a display device, or output an audible alarm, or stop the manufacturing of the optical fiber ribbon 1 by the manufacturing system 100. In cases where the control device 42 (abnormality determination unit 432) can determine the types of abnormalities, the control device 42 may vary the method of notification depending on the type of abnormality.

In the description above, during test operation (first operation), the torque (load) is measured while rotating the rotary blades 321 at the rotation speed ω1, whereas during normal operation (second operation), the torque (load) is measured while rotating the rotary blades 321 at the rotation speed ω2, and abnormalities are detected based on torque measurement results. Note, however, that the load to be measured for abnormality detection is not limited to torque, as will be described below. Further, even in cases where torque is measured as the load, the torque to be measured is not limited to the torque when rotating the rotary blades 321.

Modified Example

Figure 9A:
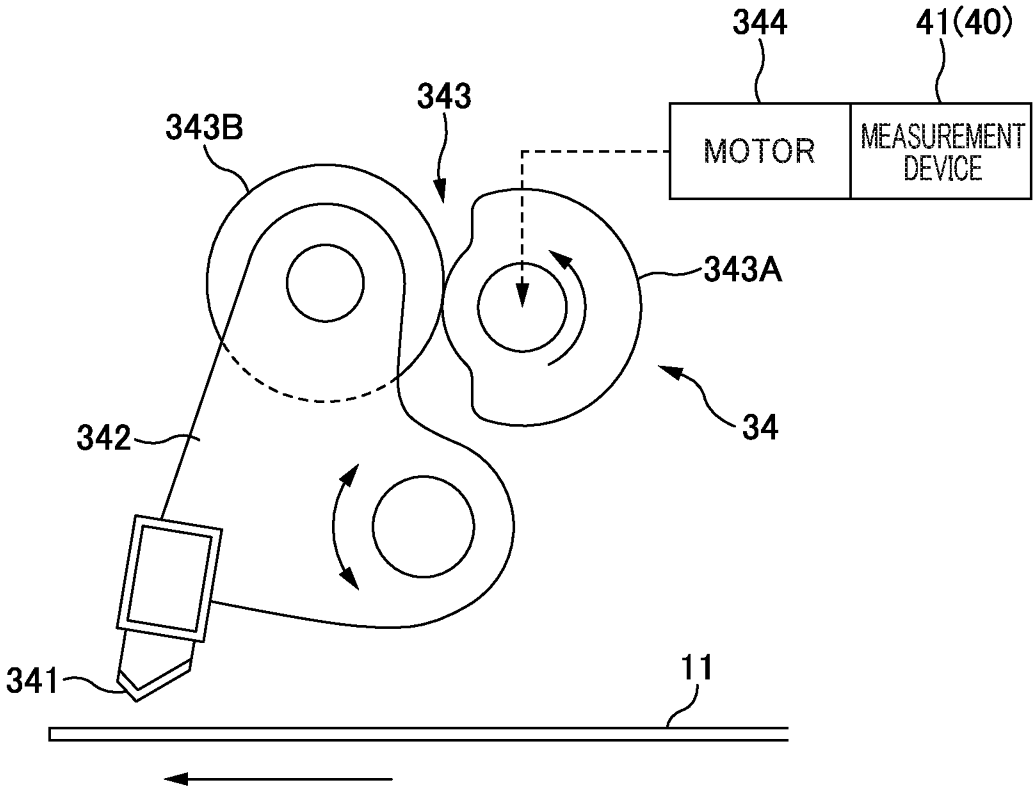
FIG. 9A is an explanatory diagram of a connecting device according to a modified example.
Figure 9B:
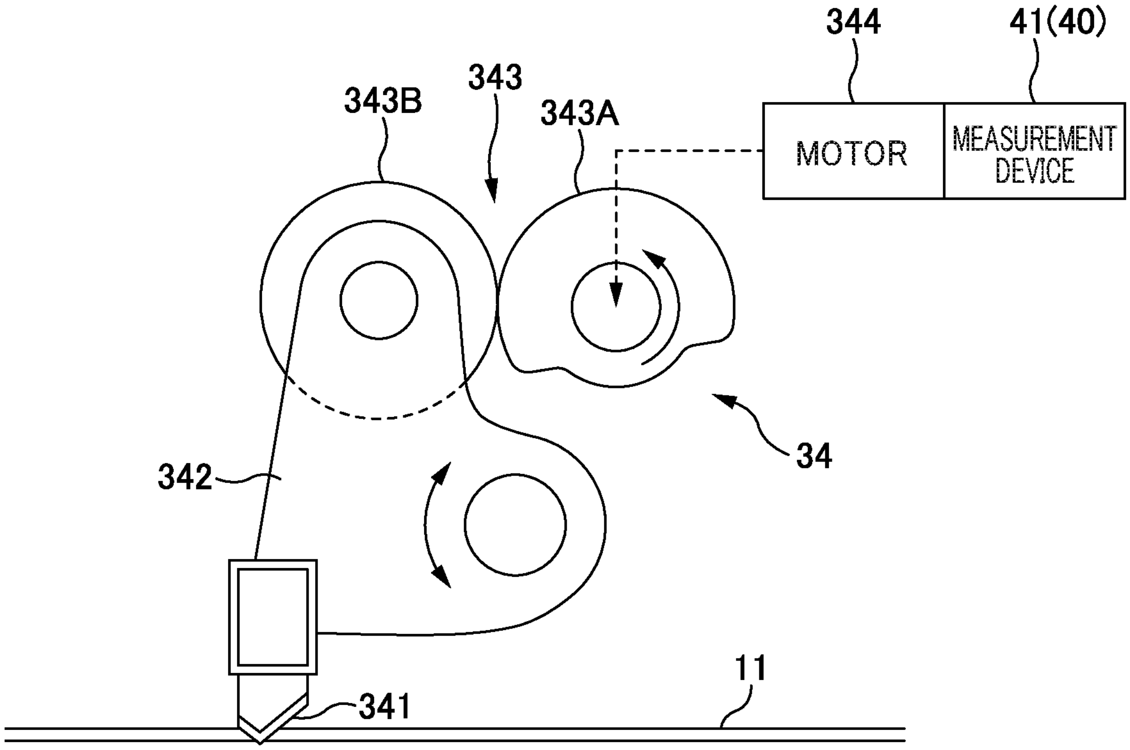
FIG. 9B is an explanatory diagram of a connecting device according to a modified example.

FIGS. 9A and 9B are explanatory diagrams of a connecting device 30 according to a modified example.

Also in the modified example, the connecting device 30 is configured to intermittently form connection parts 12 between optical fibers 11. The connecting device 30 of the modified example includes the aforementioned application unit 31 and curing unit 33, and also a separating unit 34. The separating unit 34 is configured to intermittently form non-connected parts 13 between the optical fibers 11. The connecting device 30 of the modified example first collectively connects the plurality of optical fibers 11 with a connecting agent 14 (for example, the application unit 31 applies the connecting agent 14 to the circumference of the optical fibers 11 and between the optical fibers 11, and then the curing unit 33 cures the connecting agent 14), and thereafter, the separating unit 34 illustrated in the figure forms the non-connected parts 13 between the optical fibers 11, and thereby intermittently forms the connection parts 12.

The separating unit 34 moves blades 341 vertically, to thereby form the non-connected parts 13 at the parts where the blades 341 have been inserted between the optical fibers 11, and form the connection parts 12 at the parts where the blades 341 have not been inserted between the optical fibers 11. Stated differently, in the modified example, after the plurality of optical fibers 11 have been collectively connected by the connecting agent 14 (and the connecting agent 14 has been cured), the blades 341 separate the connecting agent 14 (the cured connecting agent 14) between the optical fibers 11, to thereby form the non-connected parts 13.

The connecting device 30 (more specifically, the separating unit 34) of the modified example includes the aforementioned blades 341, an oscillating member 342, a cam mechanism 343 (a cam member 343A and a following member 343B), and a motor 344. The blades 341 are installed on the oscillating member 342. The motor 344 rotates the cam member 343A, and the oscillating member 342 receives force from the cam mechanism 343 and oscillates about a support shaft, and as a result, the blades 341 move up and down.

In the modified example, the measurement device 41 (see FIG. 2A) of the abnormality detection device 40 measures the torque of the motor 344 (the load of the connecting device 30). The measurement device 41 may measure the rotation position of the cam member 343A (or the rotation position of the output shaft of the motor 344). In the modified example, when the blades 341 are inserted between the optical fibers 11, the torque becomes relatively high. Conversely, when the blades 341 are pulled out from between the optical fibers 11, the torque becomes relatively low. As a result, also in the modified example, during normal times, the torque changes over time periodically within a predetermined numerical range. So, also in the modified example, the abnormality determination unit 432 can detect abnormalities when intermittently forming the connection parts 12 based on the torque (and the rotation position) measured by the measurement device 41, as in the example described above.

As illustrated in this modified example, the connecting device 30 does not necessarily have to use rotary blades 321. Also, as illustrated in this modified example, the abnormality detection device 40 does not necessarily have to measure the load of the motor 323 for rotating the rotary blades 321. For example, the connecting device 30 may use a transfer roller to transfer the connecting agent 14 onto the ribbon surface of the optical fiber ribbon 1 according to a predetermined pattern (for example, a zigzag pattern) and thereby apply the connecting agent 14 in a zigzag pattern onto the ribbon surface of the optical fiber ribbon 1, thereby intermittently forming the connection parts 12 between the optical fibers 11 in this way. In this case, the measurement device 41 of the abnormality detection device 40 may measure, as the load of the connecting device 30, the torque of a motor configured to rotate the transfer roller.

Second Example

Figure 10:
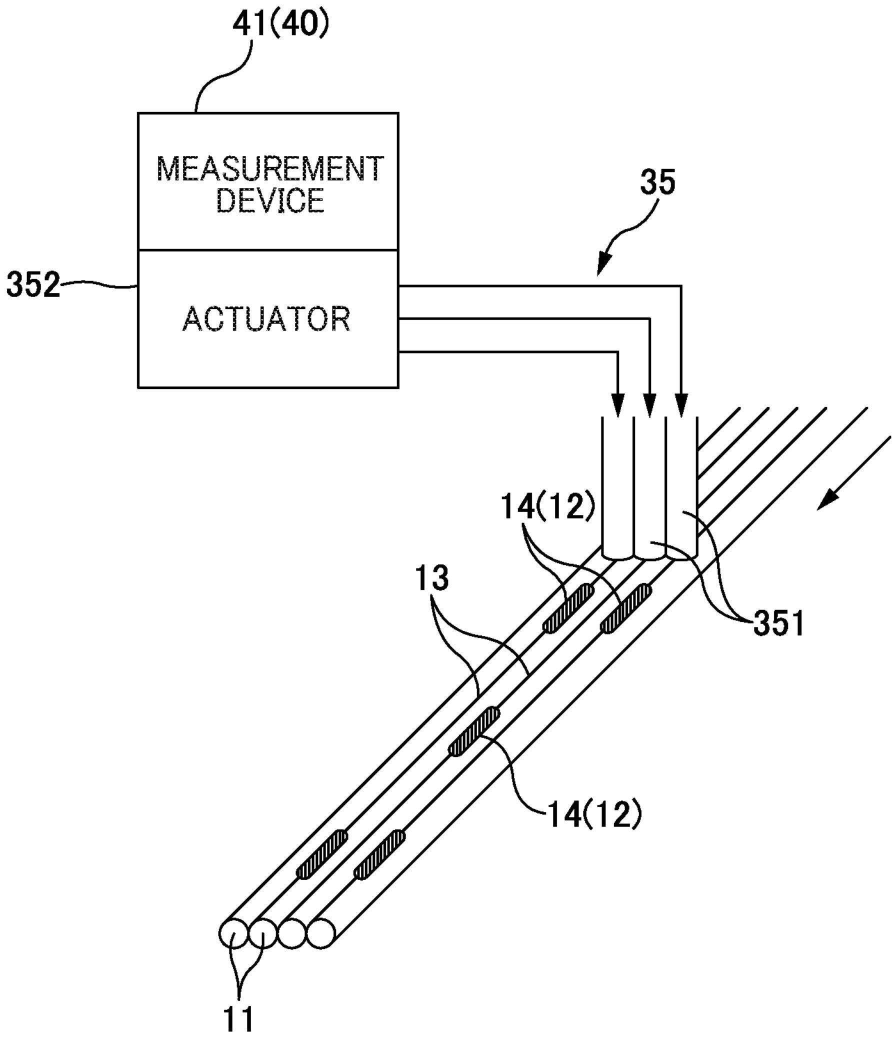
FIG. 10 is an explanatory diagram of a connecting device according to a second example.

FIG. 10 is an explanatory diagram of a connecting device 30 according to a second example.

Also in the second example, the connecting device 30 is configured to intermittently form connection parts 12 between optical fibers 11. The connecting device 30 of the second example intermittently forms the connection parts 12 by intermittently applying a connecting agent 14 between the optical fibers 11. Parts where no connecting agent 14 has been applied become non-connected parts 13.

The connecting device 30 (application unit 31) of the second example includes a plurality of dispensers 35. The dispenser 35 is a device configured to discharge the connecting agent 14. A discharge opening 351 of the dispenser 35 is located so as to oppose a position in between the optical fibers 11. The dispenser 35 discharges the connecting agent 14 from the discharge opening 351 by driving an actuator 352. For example, the actuator 352 is constituted by a pump, an on-off valve, or the like. By intermittently driving the actuator 352, the dispenser 35 intermittently discharges the connecting agent 14 toward a position between the optical fibers 11.

In the second example, the measurement device 41 (see FIG. 2A) of the abnormality detection device 40 measures the load of the actuator 352 (the load of the connecting device 30). For example, the measurement device 41 measures the voltage (or current) for driving the actuator 352, to thereby measure the load of the connecting device 30. In the second example, the voltage for driving the actuator 352 increases at the time of discharging the connecting agent 14 from the discharge opening 351, whereas the voltage for driving the actuator 352 decreases when no connecting agent 14 is being discharged from the discharge opening 351. Therefore, also in the second example, during normal times, the load of the connecting device 30 (in this example, the load of the actuator 352) changes over time periodically within a predetermined numerical range. So, also in the second example, the abnormality determination unit 432 can detect abnormalities when intermittently forming the connection parts 12 based on the load of the connecting device 30 measured by the measurement device 41.

Modified Example

Figure 11A:
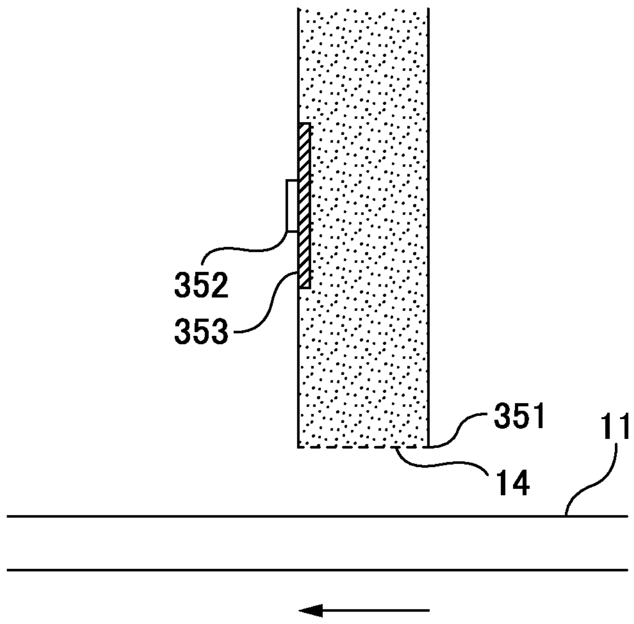
FIG. 11A is an explanatory diagram of a connecting device according to a modified example of the second example.
Figure 11B:
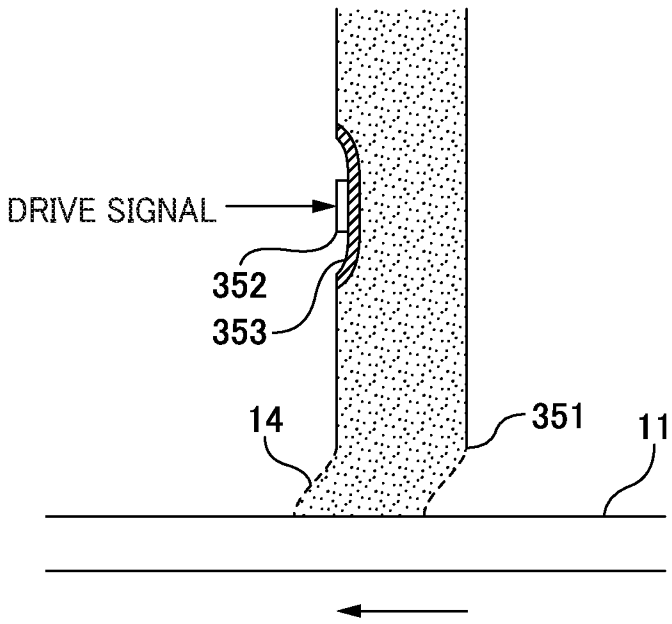
FIG. 11B is an explanatory diagram of a connecting device according to a modified example of the second example.

FIGS. 11A and 11B are explanatory diagrams of a connecting device 30 according to a modified example of the second example. Also in this modified example, the connecting device 30 (application unit 31) includes a plurality of dispensers 35, and the dispenser 35 has a discharge opening 351 located so as to oppose a position in between the optical fibers 11, as illustrated in FIG. 10.

The dispenser 35 of the modified example includes a piezoelectric element (piezo device) as an actuator 352. The piezoelectric element is disposed on a diaphragm 353. The diaphragm 353 is disposed on a wall surface of a chamber filled with the connecting agent 14. As illustrated in FIG. 11B, when the actuator 352 (piezoelectric element) is driven by a drive signal, the diaphragm 353 vibrates, and this causes the connecting agent 14 to be pushed out from the discharge opening 351. The connecting agent 14 pushed out from the discharge opening 351 adheres to the optical fibers 11, and thereby the connecting agent 14 is applied between the optical fibers 11.

Figure 12A:
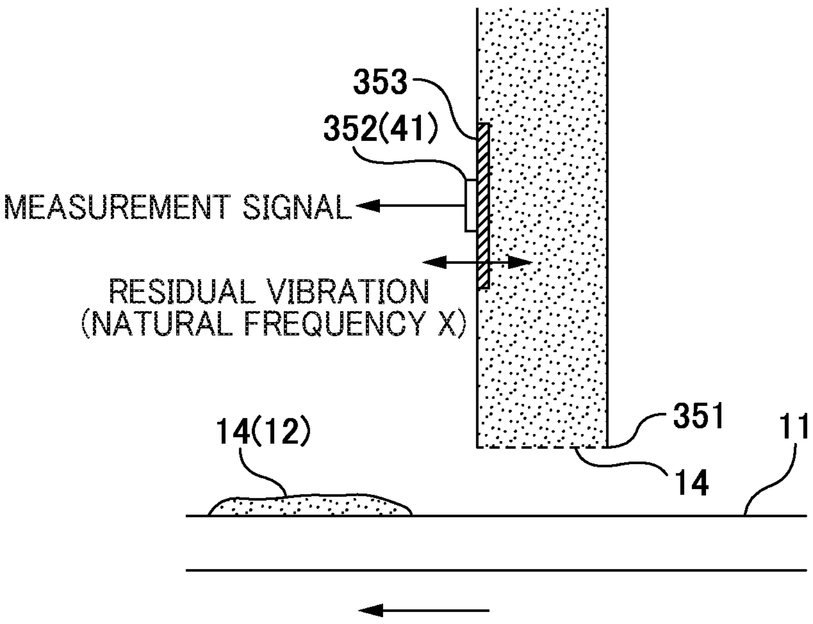
FIG. 12A is an explanatory diagram of a measurement method according to a modified example.
Figure 12B:
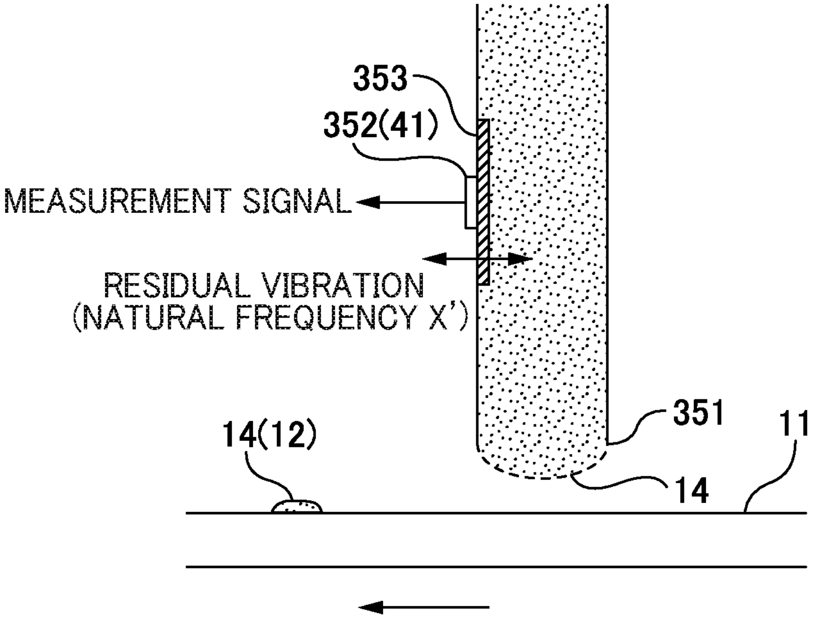
FIG. 12B is an explanatory diagram of a measurement method according to a modified example.

FIGS. 12A and 12B are explanatory diagrams of a measurement method according to the modified example. After the actuator 352 is driven by the drive signal, the diaphragm 353 (and the actuator 352) undergoes vibration. In the modified example, the actuator 352, which is constituted by the piezoelectric element, is capable of receiving pressure (load) caused by the residual vibration of the diaphragm 353 (and the connecting agent 14 inside the chamber) and converting this pressure into an electric signal and outputting it as a measurement signal. Stated differently, in the modified example, the actuator 352 functions as a part of the measurement device 41, and the actuator 352 (piezoelectric element) measures the pressure (load) that the actuator 352 receives immediately after the actuator 352 is driven.

As illustrated in FIG. 12A, when a normal amount of connecting agent 14 is applied to the optical fibers 11, the diaphragm 353 (and the connecting agent 14 inside the chamber) undergoes residual vibration at a predetermined natural frequency X, and the actuator 352 (piezoelectric element) outputs a measurement signal corresponding to the natural frequency X. On the other hand, as illustrated in FIG. 12B, when an abnormal amount of connecting agent 14 is applied to the optical fibers 11, the diaphragm 353 undergoes residual vibration at a natural frequency X' that is different from the predetermined natural frequency X, and thus, the actuator 352 (piezoelectric element) outputs a measurement signal corresponding to the residual vibration at the natural frequency X'. For example, if only a smaller-than-normal amount of connecting agent 14 is applied to the optical fibers 11, then the amount of connecting agent 14 remaining in the chamber will increase, and as a result, the natural frequency X' of the diaphragm 353 will be lower than the natural frequency X at normal times. So, in the modified example, the measurement device 41 measures the pressure (load) received by the actuator 352 (piezoelectric element), and the abnormality determination unit 432 finds the natural frequency of the diaphragm 353 (and the connecting agent 14 inside the chamber) based on the measurement result, and, based on this natural frequency, detects abnormalities in application of the connecting agent 14 by the connecting device 30.

Incidentally, in cases where there is an abnormality on the surface of an optical fiber 11, there will also be an abnormality in the amount of connecting agent 14 which adheres to that optical fiber 11. By utilizing this phenomenon, the modified example can indirectly detect abnormalities in the optical fibers 11. Note, however, that in cases where the connecting agent 14 is applied to the optical fibers 11 by spraying liquid droplets of the connecting agent 14 from the discharge opening 351, it may be difficult to detect abnormalities in the optical fibers 11 by using the actuator 352 (piezoelectric element) because the discharge opening 351 and the optical fibers 11 are always in a non-contact state. So, in cases of indirectly detecting abnormalities in the optical fibers 11 by using the actuator 352 (piezoelectric element) as in this modified example, it is preferable to make the discharge opening 351 and the optical fibers 11 contact one another indirectly via the connecting agent 14 by pressing out the connecting agent 14 from the discharge opening 351 for application onto the optical fibers 11 as illustrated in FIG. 11B, rather than spraying liquid droplets of the connecting agent 14 from the discharge opening 351.

It should be noted that the dispenser of the connecting device 30 does not have to intermittently discharge the connecting agent 14. For example, the dispenser may continuously discharge the connecting agent 14 while moving back and forth in the width direction so as to apply the connecting agent 14 in a zigzag pattern on the ribbon surface of the optical fiber ribbon 1, to thereby form the connection parts 12 intermittently between the optical fibers 11. In this case, the measurement device 41 of the abnormality detection device 40 may measure the load of the connecting device 30 by measuring the voltage (or current) for driving the actuator 352 as in the aforementioned second example, or may measure the load of the connecting device 30 by measuring the torque of the motor for moving the dispenser back and forth in the width direction as in the aforementioned first example.

Summary:

The method for manufacturing an optical fiber ribbon 1 according to the foregoing first and second examples (and modified examples thereof) involves: (1) intermittently forming, with a connecting device 30, connection parts 12 between optical fibers 11, to manufacture an intermittently-connected optical fiber ribbon 1; (2) measuring a load of the connecting device 30 when intermittently forming the connection parts 12; and (3) detecting an abnormality based on the measured load. With this method for manufacturing an optical fiber ribbon 1, it is possible to achieve early detection of abnormalities occurring during manufacturing of an intermittently-connected optical fiber ribbon 1.

In the first example (and modified example thereof), the connecting device 30 includes a motor (motor 323 or motor 344), the torque of the motor is measured as the load of the connecting device 30, and an abnormality is detected based on the torque. In this way, abnormalities during manufacture can be detected at an early stage. It should be noted that, as in the second example for example, detection of abnormalities does not have to be based on torque.

In the first example, the connecting device 30 includes a separating unit 32, 34 configured to intermittently separate the optical fibers 11 (the separating unit 32 configured to remove a portion of the connecting agent 14 while leaving another portion thereof by rotating rotary blades 321 with the motor 323; the separating unit 34 configured to form non-connected parts 13 between the optical fibers 11 by driving blades 341 with the motor 344). In the first example, the torque of the motor 323, 344 of the separating unit 32, 34 is measured, and an abnormality is detected based on the torque. In such a connecting device 30, during normal times, the torque changes over time periodically within a predetermined numerical range, and thus, abnormalities can be detected based on the torque.

In the first example, the separating unit 32 includes rotary blades 321; the torque of the motor 323 for rotating the rotary blades 321 is measured, and also, the rotation position of the rotary blades 321 is measured, and an abnormality in the layout of the connection parts 12 is detected based on the torque and the rotation position (see FIGS. 7A and 7B). It should be noted that abnormalities (for example, abnormalities in the contact state of the rotary blades 321) can be detected based only on the torque, without measuring the rotation position of the rotary blades 321.

In the first example, the torque when the rotary blades 321 are rotated at a rotation speed ω1 (first rotation speed) is measured, and if it is determined that there is no abnormality based on the measured torque, then: (1) the rotary blades 321 are rotated at a rotation speed ω2 (second rotation speed) which is faster than the rotation speed ω1 to thereby manufacture the optical fiber ribbon 1; (2) the torque when the rotary blades 321 are rotated at the rotation speed ω2 to form the connection parts 12 is measured; and (3) abnormalities are detected based on the torque when the rotary blades 321 are rotated at the rotation speed ω2 (see FIG. 8).

As described above, it is preferable to manufacture the optical fiber ribbon 1 by rotating the rotary blades 321 at a faster rotation speed after confirming that there is no initial abnormality. In this way, damage to the connecting device 30 can be suppressed.

In the first example, during test operation (when the rotary blades 321 are rotated at the rotation speed ω1), abnormalities are detected by comparing the measured torque with pre-defined initial determination data. During test operation, the rotation speed of the rotary blades 321 is set to a relatively low speed, and therefore, the torque of the motor 323 is less likely to be affected by the environment. Thus, during test operation, even if pre-defined initial determination data is used for detecting abnormalities, determination error can be suppressed. On the other hand, during normal operation (when the rotary blades 321 are rotated at the rotation speed ω2), if abnormality detection is carried out based on pre-defined determination data, then the torque of the motor 323 may vary depending on the environment (for example, the temperature and/or humidity) at the time of manufacture. So, in the first example, during normal operation (when the rotary blades 321 are rotated at the rotation speed ω2), the determination data 452 is updated continually based on the torque when the rotary blades 321 are rotated at the rotation speed ω2, and abnormalities are detected by comparing the measured torque with the updated determination data 452. In this way, determination error can be suppressed.

It should be noted that the load to be measured for performing abnormality detection is not limited to torque. Further, even in cases where torque is measured as the load, the torque to be measured is not limited to the torque when the rotary blades 321 are rotated. For example, as in the modified example of the first example, the torque of the motor 344 may be measured as the load of the connecting device 30. Furthermore, as in the second example, the load of the actuator 352 of the dispenser 35 may be measured as the load of the connecting device 30. Also in these cases, it is preferable to measure the load when the connecting device 30 is caused to perform a test operation (first operation), and determine initial abnormalities based on the load during the test operation. Further, it is preferable to cause the connecting device 30, which has been performing the test operation (first operation), to perform a normal operation (second operation) to form the connection parts 12 if it is determined that there is no abnormality based on the load measured during the test operation (first operation). Also in this case, damage to the connecting device 30 can be suppressed. It should be noted that, if it is determined that there is no abnormality based on the load measured during the test operation (first operation), it is preferable to: (1) cause the connecting device 30, which has been performing the test operation (first operation), to perform a normal operation (second operation) to form the connection parts 12; (2) measure the load of the connecting device 30 when the connecting device 30 is performing the normal operation; and (3) detect abnormalities based on the load of the connecting device 30 when the connecting device 30 is performing the normal operation (second operation).

Further, in both the modified example of the first example and the second example, when detecting initial abnormalities based on the load of the connecting device 30 when the connecting device 30 is caused to perform a test operation (first operation), it is preferable to compare the measured load of the connecting device 30 with pre-defined initial determination data. This is because determination error can be suppressed even if pre-defined initial determination data is used for detecting abnormalities, because during test operation, the load of the connecting device 30 is less likely to be affected by the environment. On the other hand, when detecting abnormalities based on the load of the connecting device 30 when the connecting device 30 is caused to perform normal operation (second operation), it is preferable to continually update the determination data based on the load for when the connecting device 30 is performing normal operation, and compare the measured load of the connecting device 30 with the updated determination data. In this way, determination error can be suppressed.

In the second example (and modified example thereof), the connecting device 30 includes dispensers 35, and the load of the actuator 352 of the dispenser 35 is measured as the load of the connecting device 30, and abnormalities are detected based on the load of the actuator 352. Also in this way, abnormalities during manufacturing can be detected at an early stage.

In the modified example of the second example, after a piezoelectric element is driven to apply the connecting agent 14 to the optical fibers 11, the piezoelectric element measures residual vibration of the connecting agent 14, and abnormalities are detected based on the measured residual vibration. In this way, the actuator 352 of the connecting device 30 can function as a part of the measurement device 41.

Others:

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical fiber ribbon;
11: Optical fiber;
12: Connection part;
13: Non-connected part;
14: Connecting agent;
15: Identification mark;
20: Fiber supply device;
21: Supply source;
22: Printing device;
23: Coloring device;
30: Connecting device;
31: Application unit;
32: Separating unit;
321: Rotary blade;
321A: Protrusion part;
321B: Recess part;
322: Shaft;
323: Motor;
324: Guide;
33: Curing unit;
34: Separating unit;
341: Blade;
342: Oscillating member;
343: Cam mechanism;
343A: Cam member;
343B: Following member;
344: Motor;
35: Dispenser;
351: Discharge opening;
352: Actuator;

353: Diaphragm;

40: Abnormality detection device;

41: Measurement device;

41A: Torque measurement unit;

41B: Position measurement unit;

42: Control device;

43: Processor;

431: Data acquisition unit;

432: Abnormality determination unit;

45: Data storage unit;

451: Measurement data;

452: Determination data;

100: Manufacturing system.

The invention claimed is:

1. A manufacturing method for manufacturing an optical fiber ribbon, the manufacturing method comprising:

intermittently forming, with a connecting device, connection parts between optical fibers;

measuring a load of the connecting device during the intermittent forming of the connection parts; and detecting an abnormality based on the load, wherein the load is a torque of a motor in the connecting device, the intermittent forming of the connection parts comprises intermittently separating the optical fibers with a separating unit of the connecting device, the load is the torque of the motor that drives the separating unit, and the manufacturing method further comprises:

measuring a rotation position of a rotary blade in the separating unit; and detecting the abnormality in layout of the connection parts based on the torque and the rotation position.

2. The manufacturing method according to claim 1, further comprising:

measuring the load when the connecting device performs a first operation; and in response to determining that there is no abnormality based on the load when the connecting device performs the first operation, switching the connecting device from the first operation to a second operation to form the connection parts.

3. The manufacturing method according to claim 2, further comprising:

in response to detecting the abnormality based on the load when the connecting device performs the first operation, comparing the load with pre-defined initial determination data; and in response to detecting the abnormality based on the load when the connecting device performs the second operation, comparing the load with data updated based on the load when the connecting device performs the second operation.

4. A manufacturing method for manufacturing an optical fiber ribbon, the manufacturing method comprising:

intermittently forming, with a connecting device, connection parts between optical fibers;

measuring a load of the connecting device during the intermittent forming of the connection parts; and detecting an abnormality based on the load, wherein the connecting device includes a dispenser that applies a connecting agent, and the manufacturing method further comprises:

measuring a load of an actuator of the dispenser; and detecting the abnormality based on the load of the actuator.

5. The manufacturing method according to claim 4, further comprising:

measuring, with a piezoelectric element of the actuator, a residual vibration of the connecting agent after the piezoelectric element applies the connecting agent to the optical fibers; and detecting the abnormality based on the residual vibration.

6. A manufacturing system for manufacturing an optical fiber ribbon, the manufacturing system comprising:

a connecting device that intermittently forms connection parts between optical fibers;

a measurer that measures a load of the connecting device during the intermittent forming of the connection parts; and a controller that detects an abnormality based on the load, wherein the load is a torque of a motor in the connecting device, the connection parts comprise a separating unit that intermittently separates the optical fibers, the load is the torque of the motor that drives the separating unit, and the measurer further measures a rotation position of a rotary blade in the separating unit, and the controller detects the abnormality in layout of the connection parts based on the torque and the rotation position.

7. The manufacturing system according to claim 6, wherein the controller controls the connecting device to perform a first operation and the measurer to measure the load, and in response to determining that there is no abnormality based on the load when the connecting device performs the first operation, the controller switches the connecting device from the first operation into a second operation to form the connection parts.

8. The manufacturing system according to claim 6, wherein the controller determines a type of the abnormality based on the load.

9. A manufacturing method for manufacturing an optical fiber ribbon, the manufacturing method comprising:

intermittently forming, with a connecting device, connection parts between optical fibers;

measuring a load of the connecting device during the intermittent forming of the connection parts;

detecting an abnormality based on the load; and determining a type of the abnormality based on the load, wherein the connecting device includes a separating unit that intermittently separates the optical fibers and that includes a rotary blade and a motor that drives the rotary blade, the load is a torque of the motor, and the manufacturing method further comprises:

determining a contact abnormality of the rotary blade when the torque is greater than a threshold.

10. A manufacturing method for manufacturing an optical fiber ribbon, the manufacturing method comprising:

intermittently forming, with a connecting device, connection parts between optical fibers;

measuring a load of the connecting device during the intermittent forming of the connection parts;

detecting an abnormality based on the load; and determining a type of the abnormality based on the load, wherein the connecting device includes a separating unit that intermittently separates the optical fibers and that includes a rotary blade and a motor that drives the rotary blade, the load is a torque of the motor, and the manufacturing method further comprises:

determining the abnormality due to connecting agent depletion when the torque is continuously below a threshold.

11. A manufacturing system for manufacturing an optical fiber ribbon, the manufacturing system comprising:

a connecting device that intermittently forms connection parts between optical fibers;

a measurer that measures a load of the connecting device during the intermittent forming of the connection parts; and a controller that detects an abnormality based on the load, wherein the connecting device includes a dispenser that applies a connecting agent, the measurer measures a load of an actuator of the dispenser, and the controller detects the abnormality based on the load of the actuator.

* * * * *